US012783293B2

(12) United States Patent
Camenisch et al.

(10) Patent No.: US 12,783,293 B2
(45) Date of Patent: Nov. 3, 2026

(54) MIGRATION OF COMPUTATIONAL UNITS IN DISTRIBUTED NETWORKS

(71) Applicant: DFINITY STIFTUNG, Zürich (CH)

(72) Inventors: Jan Camenisch, Thalwil (CH); Andrea Cerulli, Zürich (CH); David Derler, Horgen (CH); Manu Drijvers, Zürich (CH); Roman Kashitsyn, Pfäffikon ZH (CH); Dominic Williams, Palo Alto, CA (US)

(73) Assignee: DFINITY STIFTUNG, Zürich (CH)

( * ) Notice: Subject to any disclaimer, the term of this patent is extended or adjusted under 35 U.S.C. 154(b) by 570 days.

(21) Appl. No.: 18/014,117

(22) PCT Filed: Dec. 21, 2020

(86) PCT No.: PCT/EP2020/087406

§ 371 (c)(1),
(2) Date: Dec. 30, 2022

(87) PCT Pub. No.: WO2022/002427

PCT Pub. Date: Jan. 6, 2022

(65) Prior Publication Data

US 2023/0266994 A1 Aug. 24, 2023

Related U.S. Application Data

(60) Provisional application No. 63/046,444, filed on Jun. 30, 2020.

(51) Int. Cl.
*G06F 9/48* (2006.01)

(52) U.S. Cl.
CPC .................................. *G06F 9/4875* (2013.01)

(58) Field of Classification Search
CPC . G06F 9/4875; G06F 9/4856; H04L 41/0813; H04L 41/0895; H04L 41/0897
See application file for complete search history.

(56) References Cited

U.S. PATENT DOCUMENTS 8,738,745 B1 5/2014 Brandwine et al.
9,495,269 B1 * 11/2016 Hart ...................... G06F 3/0647
(Continued)

FOREIGN PATENT DOCUMENTS

WO 2013157042 A1 10/2013
WO 2014014477 1/2014
(Continued)

OTHER PUBLICATIONS

"International Search Report and Written Opinion for PCT Application No. PCT/EP2020/087406", mailed Jul. 7, 2021, 18 pages.
(Continued)

*Primary Examiner* — Jorge A Chu Joy-Davila
(74) *Attorney, Agent, or Firm* — Mannava & Kang, P.C.

(57) ABSTRACT

According to an embodiment of a first aspect of the invention, there is provided a computer-implemented method for operating a distributed network. The distributed network comprises a plurality of subnets embodied as replicated computing clusters. The method further comprises migrating a computational unit from a first subnet of the plurality of subnets to a second subnet of the plurality of subnets. The migrating comprises signalling to the first and the second subnet a computational unit of the first subnet as migrant computational unit that shall be migrated. The migrating further comprises transferring the migrant computational unit from the first subnet to the second subnet, installing the migrant computational unit on the second subnet and activating and running the migrant computational unit on the second subnet.
Further aspects of the invention relate to a corresponding distributed network, a node, a computer program product and a software architecture.

19 Claims, 17 Drawing Sheets

201 202

(56) References Cited

U.S. PATENT DOCUMENTS

| | | | |
|---|---|---|---|
| 2009/0198817 | A1 | 8/2009 | Sundaram et al. |
| 2012/0137287 | A1* | 5/2012 | Pang ..................... G06F 9/5088 718/1 |
| 2014/0052949 | A1 | 2/2014 | Wang et al. |
| 2015/0135268 | A1* | 5/2015 | Silverman ............... H04L 63/08 726/3 |
| 2016/0127495 | A1 | 5/2016 | Tasoulas et al. |
| 2017/0005923 | A1* | 1/2017 | Babakian ............ G06F 9/45558 |
| 2018/0210766 | A1* | 7/2018 | Beyh ..................... G06F 9/5083 |
| 2019/0342143 | A1* | 11/2019 | Lin ..................... H04L 41/0896 |
| 2019/0363938 | A1 | 11/2019 | Liebinger Portela et al. |

FOREIGN PATENT DOCUMENTS

| | | | |
|---|---|---|---|
| WO | 2014014477 | A1 | 1/2014 |
| WO | 2019072282 | A2 | 4/2019 |
| WO | 2019072292 | A2 | 4/2019 |

OTHER PUBLICATIONS

Dejan Milojicic et al., "Process Migration", Feb. 1, 1999, 49 pages.

Japanese Patent Office, "Notice of Reasons for Refusal for Japanese Patent Application No. JP2023-523328", dated Feb. 5, 2025, 3 pages.

Intellectual Property Office of Singapore, "Search Report and Written Opinion for Application No. 11202261650Y", dated Nov. 18, 2025, 12 pages.

Jacob R. Lorch et al., "The SMART way to migrate replicated stateful services", Proceedings of the 1st ACM SIGOPS/EuroSys European Conference on Computer Systems 2006, Apr. 18, 2006, pp. 103-115.

Korean Intellectual Property Office, "Request for the Submission of an Opinion" for KR application No. KR20230038719, mailed on Jul. 16, 2025, 12 pages.

* cited by examiner

600

800

1600

MIGRATION OF COMPUTATIONAL UNITS IN DISTRIBUTED NETWORKS

CLAIM FOR PRIORITY

The present application is a national stage filing under 35 U.S.C 371 of PCT application number PCT/EP2020/087406, having an international filing date of Dec. 21, 2020, which claims priority to U.S. patent application Ser. No. 63/046,444 having a filing date of Jun. 30, 2020, the disclosures of which are hereby incorporated by reference in their entireties.

TECHNICAL FIELD

The present invention pertains to a method for operating a distributed network, the distributed network comprising a plurality of subnets. Each subnet comprises a plurality of nodes.

Further aspects relate to a corresponding distributed network, a node of a distributed network, a corresponding computer program product and a software architecture encoded on a non-transitory medium.

BACKGROUND ART

In distributed networks a plurality of nodes are arranged in a distributed fashion. In distributed networks computing, software and data are spread out across the plurality of nodes. The nodes establish computing resources and the distributed networks may use distributed computing techniques.

An example of distributed networks are blockchain networks. Blockchain networks are consensus-based, electronic ledgers based on blocks. Each block comprises transactions and other information. Furthermore, each block contains a hash of the previous block so that blocks become chained together to create a permanent, unalterable record of all transactions which have been written to the blockchain. Transactions may contain small programs known e.g. as smart contracts.

In order for a transaction to be written to the blockchain, it must be "validated" by the network. In other words, the network nodes have to gain consent on blocks to be written to the blockchain. Such consent may be achieved by various consensus protocols.

One type of consensus protocols are proof-of-work consensus protocols. A proof-of-work consensus protocol generally requires some work from the parties that participate in the consensus protocol, usually corresponding to processing time by a computer. Proof-of-work-based cryptocurrency systems such as Bitcoin involve the solving of computationally intensive puzzles to validate transactions and to create new blocks.

Another type of consensus protocols are proof-of-stake-consensus protocols. Such proof-of-stake protocols have the advantage that they do not require time-consuming and energy-intensive computing. In proof-of-stake based blockchain networks e.g. the creator of the next block is chosen via combinations of random selection as well as the stake of the respective node in the network.

Apart from cryptocurrencies, distributed networks may be used for various other applications. In particular, they may be used for providing decentralized and distributed computing capabilities and services.

Accordingly, there is a need for distributed networks with enhanced functionalities.

DISCLOSURE OF THE INVENTION

Accordingly, one object of an aspect of the invention is to provide a distributed network with enhanced functionalities.

According to an embodiment of a first aspect of the invention, a computer-implemented method for operating a distributed network is provided. The distributed network comprises a plurality of subnets, wherein each of the plurality of subnets comprises one or more assigned nodes. The method comprises steps of running a set of computational units, assigning each of the computational units to one of the plurality of subnets according to a subnet-assignment. This creates an assigned subset of the set of computational units for each of the subnets. The method further comprises running on each node of the plurality of subnets the assigned subset of the computational units and executing, by the nodes of the plurality of subnets, computations in a deterministic and replicated manner across the subnets, thereby traversing a chain of execution states. The method further comprises migrating a computational unit from a first subnet of the plurality of subnets to a second subnet of the plurality of subnets. The migrating comprises signalling to the first and the second subnet a computational unit of the first subnet as migrant computational unit that shall be migrated. The migrating further comprises transferring the migrant computational unit from the first subnet to the second subnet, installing the migrant computational unit on the second subnet and activating and running the migrant computational unit on the second subnet.

Such an embodied method offers enhanced operation flexibility for distributed networks which operate subnets in a replicated manner. According to embodiments, the subnets may also be denoted as replicated computing clusters. In such replicated computing cluster the computational units that have been assigned to a respective subnet are run on each node of the subnet and are hence replicated across the subnet, thereby traversing the same chain of execution states.

Methods according to embodiments of the invention allow the migration of computational units from one subnet to another subnet. This improves the flexibility of the network, in particular in terms of load and capacity management of the subnets and their assigned nodes.

Such a migration of computational units may on the first sight be observed as counterintuitive in such a replicated setting as the execution states of such a distributed network may be considered as immutable as they cannot be removed anymore once they have been agreed upon by the nodes of a subnet.

Nevertheless, the inventors of the present invention have overcome such a prejudice and have designed a distributed network with subnets that form replicated computing clusters which nevertheless allow the migration of the computational units between the replicated computing clusters/subnets.

According to an embodiment, the method further comprises preparing, by the first subnet, the migrant computational unit for migration.

According to further embodiments the method, in particular the step of preparing the migrant computational unit for migration may comprise a step of scheduling a migration time. The migration time may be scheduled in various ways. According to some embodiments, it may be scheduled by a central control unit. According to other embodiments, the central control unit may just signal to the respective subnets, in particular to the first and the second subnet, that a computational unit has to be migrated. According to embodiments, the central control unit may make an update in a central registry. Then the first subnet, e.g. a computational unit manager of the first subnet, may observe the change in the registry and may schedule the corresponding migration time. The migration time defines in particular the point in time for stopping to accept messages for the migrant computational unit and for stopping to execute the migrant computational unit and/or to modify the unit state of the migrant computational unit after the migration time. In other words, after the migration time the unit state of the respective computational unit is fixed or in other words frozen and will not be modified anymore. And as it is fixed, the computational unit including its state is also ready for migration.

According to an embodiment, the plurality of subnets are configured to execute blocks in a consecutive manner and the migration time is a block height defining the last block that is to be processed by the first subnet. It should be noted that according to embodiments the blocks may be processed in an asynchronous manner and that hence the block height does not define in advance a specific calendar time as migration time, but rather the time in terms of a specific block height. In this respect the term migration time shall be understood in a broad sense.

According to an embodiment, the step of obtaining the migrant computational unit comprises joining, by the nodes of the second subnet, the first subnet. This may include running, by the nodes of the second subnet, the computational units of the first subnet. By joining the first subnet the nodes of the second subnet may observe the unit states/execution states of the computational units of the first subnet, in particular of the migrant computational unit. The joining may take place in particular before the migration time. By this the nodes of the second subnet may gain in advance trust in the unit state of the migrant computational unit. Furthermore, they may start to obtain parts of the state of the migrant computational unit in advance to reduce downtime. This facilitates an efficient transfer.

According to an embodiment the nodes of the second subnet may join the first subnet passively in a listening mode. The listening mode may comprise in particular verifying all artefacts of the first subnet, but not producing any artefacts itself. In this respect an artefact may be any information that is exchanged between the nodes of the first subnet. According to an embodiment the nodes of the second subnet may perform only a subset of the tasks for this second subnet. As an example, they may e.g. not participate in the proposal and notarization of blocks, but they may verify each block and execute it in case it is valid.

According to an embodiment the step of transferring the migrant computational unit from the first subnet to the second subnet comprises performing a node internal transfer of the migrant computational unit between a replica of the first subnet and a replica of the second subnet, wherein the replica of the first subnet and the replica of the second subnet run on the same node.

A replica is formed by a set of computational units that runs on a node and are assigned to the same subnet.

According to such an embodiment the nodes of the second subnet that have joined the first subnet run two replicas, namely a first replica for the first subnet and a second replica for the second subnet. As both replicas run on the same node, they are in the same trust domain and as the first replica, which may be in particular a passive replica, observes the states of the computational units of the first subnet including the state of the migrant computational unit, this state of the migrant computational unit may be transferred within the node and hence within the same trust domain from the first replica to the second replica and accordingly from the first subnet to the second subnet.

According to an embodiment, the step of transferring the migrant computational unit comprises obtaining, by each node of the second subnet, the migrant computational unit from a node of the first subnet via a messaging protocol.

According to such an embodiment the nodes of the second subnet are not part of the first subnet or in other words have not joined the first subnet. After the migration height has been reached, the first subnet prepares the migrant computational unit for migration. This may include in particular to perform e.g. a joint signature on the migrant computational unit by the nodes of the first subnet, thereby certifying the state of the migrant computational unit at the migration block height. The certified migrant computational unit may then be sent to the nodes of the second subnet via the messaging protocol.

According to an embodiment the step of transferring the computational unit via a messaging protocol comprises splitting, by the nodes of the first subnet, the migrant computational unit into one or more chunks and transferring the one or more chunks of the migrant computational unit via the messaging protocol from the first subnet to the second subnet. This may facilitate an efficient transfer, in particular in terms of bandwidth.

According to an embodiment the messaging protocol may include a state synchronisation protocol for synchronizing the states between the migrant computational unit on the nodes of the first subnet and a corresponding migrant computational unit that has been installed on the nodes of the second subnet.

According to an embodiment the first subnet may reject after the migration time/migration block height messages for the migrant computational unit. This facilitating a re-routing of the respective messages by the sender of the messages.

According to an embodiment, the nodes of the second subnet may agree, in particular by performing a consensus protocol, on the activating of the migrant computational unit. Such a step may ensure that a sufficient number of nodes of the second subnet has the computational unit available and that therefore the computational unit can become operational after agreement. Furthermore, this may ensure that the corresponding nodes start to execute the migrant computational unit at the same time to facilitate a deterministic processing.

According to an embodiment of a second aspect of the invention, another computer-implemented method for operating a distributed network is provided. The distributed network comprises a plurality of subnets, wherein each of the plurality of subnets comprises one or more assigned nodes. The method comprises running a set of computational units and assigning each of the computational units to one of the plurality of subnets according to a subnet-assignment, thereby creating an assigned subset of the set of computational units for each of the subnets. The method further comprises running on each node of the plurality of subnets the assigned subset of the computational units and executing, by the nodes of the plurality of subnets, computations in a deterministic and replicated manner across the subnets. The computer-implemented method comprises migrating a computational unit from a first subnet of the plurality of subnets to a second subnet of the plurality of subnets. According to this embodiment, the second subnet is not pre-existing, i.e. the second subnet has to be newly created. The migrating comprises steps of signalling to the first subnet a computational unit of the first subnet as migrant computational unit that shall be migrated. In response to the signalling the nodes of the first subnet create and start the new second subnet. Then the migrant computational unit is transferred from the first subnet to the second subnet internally, i.e. within the respective nodes between the replicas. This has the advantage that this transfer happens within the same trust domain of the respective nodes.

Further steps include installing, by the nodes of the first subnet and the second subnet, the migrant computational unit on the second subnet and activating and running, by the nodes of the first subnet and the second subnet, the migrant computational unit on the second subnet.

Before activating and running the migrant computational unit a step of agreeing on the activating, in particular by a consensus protocol, may be performed.

According to a further embodiment of the second aspect additional nodes may be added to the second subnet that are not part of the first subnet. These additional nodes are fresh nodes which may catch up with the states of the migrant computational unit e.g. via a Resumability or state recovery protocol.

A further step may comprise removing the nodes of the first subnet from the second subnet.

By this, the migrant computational unit has been completely migrated from the nodes of the first subnet to another new set of nodes.

According to embodiments a plurality of computational units may be migrated from a first subnet to a second subnet in one go with the methods as described above and below.

According to an embodiment of another aspect of the invention, a distributed network is provided which is configured to perform the method steps of the first aspect of the invention.

According to an embodiment of another aspect of the invention, a distributed network is provided which is configured to perform the method steps of the second aspect of the invention.

According to an embodiment of another aspect of the invention, a node of a distributed network is provided.

According to an embodiment of another aspect of the invention, a computer program product for operating a distributed network is provided. The computer program product comprises a computer readable storage medium having program instructions embodied therewith, the program instructions executable by one or more of a plurality of nodes of the distributed network to cause the one or more of the plurality of nodes to perform steps of the method aspects of the invention.

According to an embodiment of another aspect of the invention, a computer program product for operating a node of a distributed network is provided.

According to an embodiment of another aspect of the invention, a software architecture encoded on a non-transitory computer readable medium is provided. The software architecture is configured to operate one or more nodes of a distributed network. The encoded software architecture comprises program instructions executable by one or more of the plurality of nodes to cause the one or more of the plurality of nodes to perform a method comprising steps of the method aspects of the invention.

Features and advantages of one aspect of the invention may be applied to the other aspects of the invention as appropriate.

Other advantageous embodiments are listed in the dependent claims as well as in the description below.

BRIEF DESCRIPTION OF THE DRAWINGS

The invention will be better understood and objects other than those set forth above will become apparent from the following detailed description thereof. Such description makes reference to the annexed drawings, wherein.

MODES FOR CARRYING OUT THE INVENTION

At first, some general aspects and terms of embodiments of the invention will be introduced.

According to embodiments, a distributed network comprises a plurality of nodes that are arranged in a distributed fashion. In such a distributed network computing, software and data is distributed across the plurality of nodes. The nodes establish computing resources and the distributed network may use in particular distributed computing techniques.

According to embodiments, distributed networks may be in particular embodied as blockchain networks. The term "blockchain" shall include all forms of electronic, computer-based, distributed ledgers. According to some embodiments, the blockchain network may be embodied as proof-of-work blockchain network. According to other embodiments, the blockchain network may be embodied as proof-of-stake blockchain network.

A computational unit may be defined as a piece of software that is running on a node of the distributed network and which has its own unit state. The unit state may also be denoted as execution state.

Each of the subnets is configured to replicate the set of computational units, in particular the states of the computational units, across the subnet. As a result, the computational units of a respective traverse always the same chain of unit/execution states, provided they behave honestly. A computational unit comprises the code of the computational unit and the unit state/execution state of the computational unit.

A messaging protocol may be defined as a protocol that manages the exchange of unit-to-unit messages. In particular, the messaging protocol may be configured to route the unit-to-unit messages from a sending subnet to a receiving subnet. For this, the messaging protocol uses the respective subnet-assignment. The subnet-assignment indicates to the messaging protocol the respective location/subnet of the computational units of the respective communication.

Figure 1:
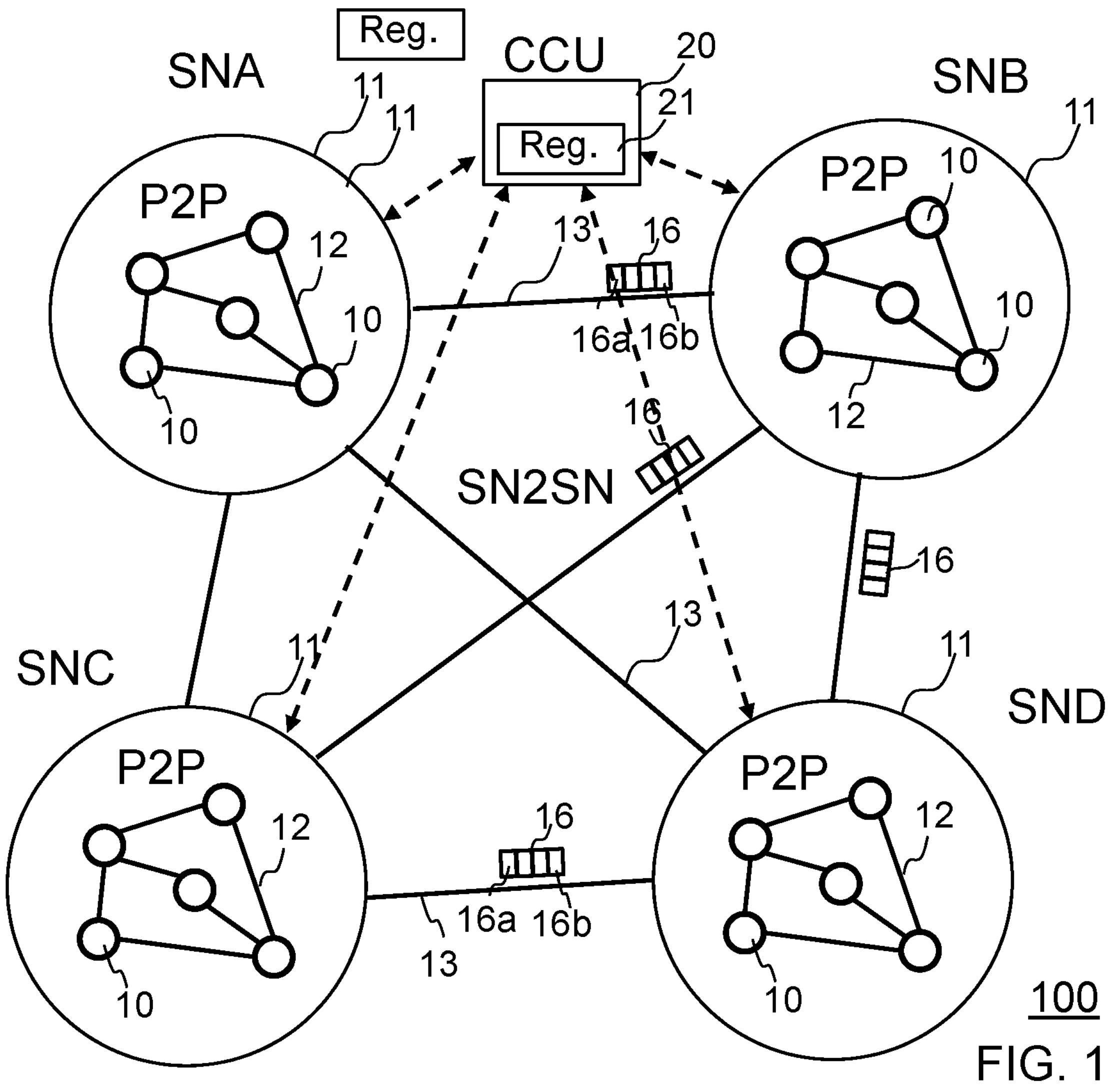
FIG. 1 shows an exemplary block diagram of a distributed network according to an embodiment of the invention.

FIG. 1 shows an exemplary block diagram of a distributed network 100 according to an embodiment of the invention.

The distributed network 100 comprises a plurality of nodes 10, which may also be denoted as network nodes 10. The plurality of nodes 10 are distributed over a plurality of subnets 11. In the example of FIG. 1, four subnets 11 denoted with SNA, SNB, SNC and SND are provided.

Each of the plurality of subnets 11 is configured to run a set of computational units on each node 10 of the respective subnet 11. According to embodiments a computational unit shall be understood as a piece of software, in particular as a piece of software that comprises or has its own unit state or in other words execution state.

The network 100 comprises communication links 12 for intra-subnet communication within the respective subnet 11, in particular for intra-subnet unit-to-unit messages to be exchanged between computational units assigned to the same subnet.

Furthermore, the network 100 comprises communication links 13 for inter-subnet communication between different ones of the subnets 11, in particular for inter-subnet unit-to-unit messages to be exchanged between computational units assigned to different subnets.

Accordingly, the communication links 12 may also be denoted as intra-subnet or Peer-to-Peer (P2P) communications links and the communication links 13 may also be denoted as inter-subnet or Subnet-to-Subnet (SN2SN) communications links.

According to embodiments, a unit state shall be understood as all the data or information that is used by the computational unit, in particular the data that the computational unit stores in variables, but also data the computational units get from remote calls. The unit state may represent in particular storage locations in the respective memory locations of the respective node. The contents of these memory locations, at any given point in the execution of the computational units, is called the unit state according to embodiments. The computational units may be in particular embodied as stateful computational units, i.e. the computational units are designed according to embodiments to remember preceding events or user interactions.

According to embodiments of the invention the subnets 11 are configured to replicate the set of computational units across the respective subnet 11. More particularly, the subnets 11 are configured to replicate the unit state of the computational units across the respective subnet 11.

The network 100 may be in particular a proof-of-stake blockchain network.

Proof-of-stake (PoS) describes a method by which a blockchain network reaches distributed consensus about which node is allowed to create the next block of the blockchain. PoS-methods may use a weighted random selection, whereby the weights of the individual nodes may be determined in particular in dependence on the assets (the "stake") of the respective node.

Figure 2:
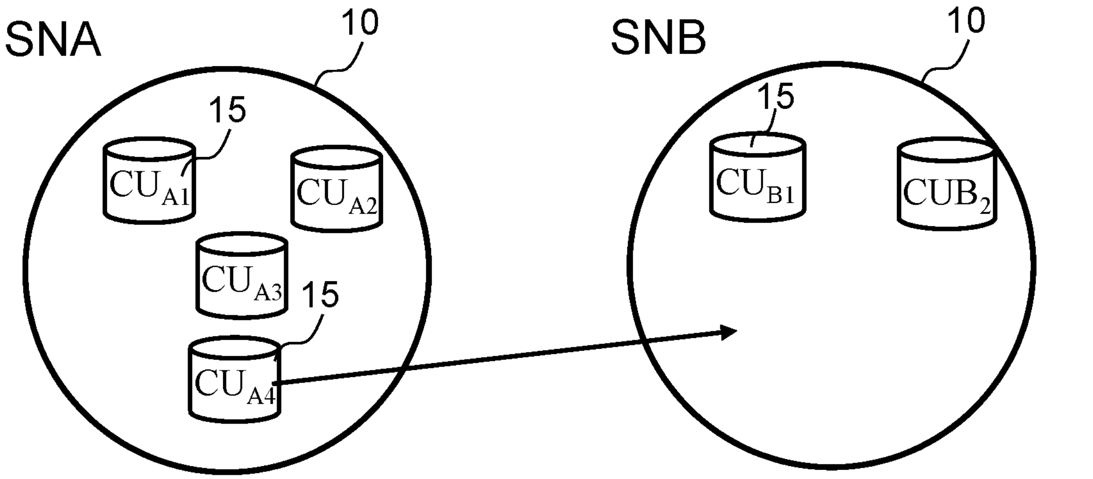
FIG. 2 illustrates in a more detailed way computational units running on nodes of the network.

FIG. 2 illustrates in a more detailed way computational units 15 running on nodes 10 of the network 100. The network 100 is configured to assign each of the computational units which are running on the network 100 to one of the plurality of subnets, in this example to one of the subnets SNA, SNB, SNC or SND according to a subnet-assignment. The subnet-assignment of the distributed network 100 creates an assigned subset of the whole set of computational units for each of the subnets SNA, SNB, SNC and SND.

More particularly, FIG. 2 shows on the left side 201 a node 10 of the subnet SNA of FIG. 1. The subnet assignment of the distributed network 100 has assigned a subset of four computational units 15 to the subnet SNA more particularly the subset of computational units $CU_{A1}$, $CU_{A2}$, $CU_{A3}$ and $CU_{A4}$. The assigned subset of computational units $CU_{A1}$, $CU_{A2}$, $CU_{A3}$ and $CU_{A4}$ runs on each node 10 of the subnet SNA. Furthermore, the assigned subset of computational units $CU_{A1}$, $CU_{A2}$, $CU_{A3}$ and $CU_{A4}$ is replicated across the whole subnet SNA such that each of the computational units $CU_{A1}$, $CU_{A2}$, $CU_{A3}$ and $CU_{A4}$ traverses the same chain of unit states. This may be implemented in particular by performing an active replication in space of the unit state of the computational units $CU_{A1}$, $CU_{A2}$, $CU_{A3}$ and $CU_{A4}$ on each of the nodes 10 of the subnet SNA.

Furthermore, FIG. 2 shows on the right side 202 a node 10 of the subnet SNB of FIG. 1. The subnet assignment of the distributed network 100 has assigned a subset of 2 computational units 15 to the subnet SNB, more particularly the assigned subset of computational units $CU_{B1}$ and $CU_{B2}$. The assigned subset of computational units $CU_{B1}$ and $CU_{B2}$ runs on each node 10 of the subnet SNB. Furthermore, the assigned subset of computational units $CU_{B1}$ and $CU_{B2}$ is replicated across the whole subnet SNB such that each of the computational units $CU_{B1}$ and $CU_{B2}$ traverses the same unit states/execution states, e.g. by performing an active replication in space of the unit states as mentioned above.

FIG. 2 illustrates a general example of a migration of a computational unit between the subnet SNA and the subnet SNB. More particularly, as the nodes of the subnet SNA already have to run 4 computational units, while the subnet SNB has only 2 computational units, the distributed network may decide to migrate the computational unit $CU_{A4}$ from the subnet SNA to the subnet SNB, e.g. for load balancing or other reasons.

As shown in FIG. 1, the distributed network 100 comprises a central control unit CCU, 20. The central control unit 20 may comprise a central registry 21 to provide network control information to the nodes of the network.

The central control unit 20 may trigger the migration of the migrant computational $CU_{A4}$ that shall be migrated. This may be done e.g. by performing an update in the central registry 21 and setting the migrant computational unit $CU_{A4}$ to a migrating state. A computational unit manager (not explicitly shown) of the subnets SNA, SNB, SNC and SND may observe such registry change in the central registry 21 and trigger the migration of the computational unit $CU_{A4}$.

According to embodiments, the central control unit may be established by a subnet.

Figure 10:
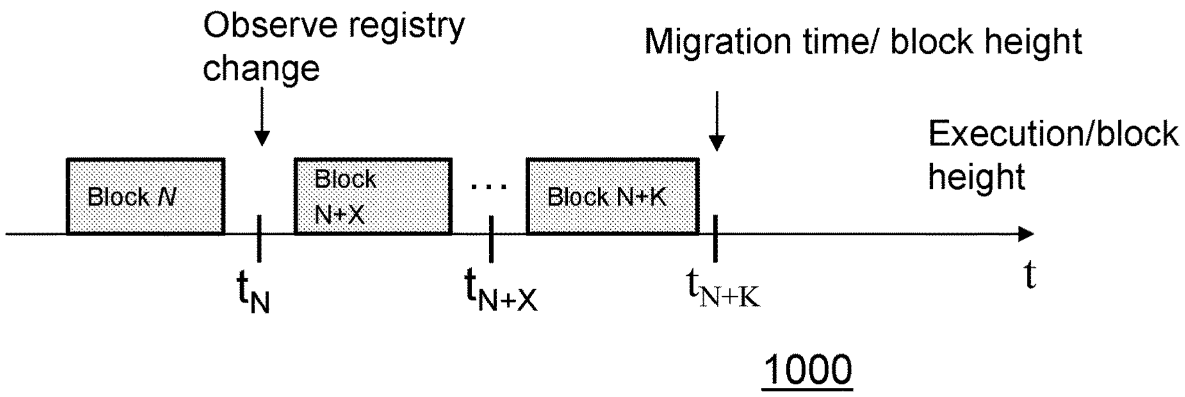
FIG. 10 shows a timing diagram of a migration of a computational unit.

Referring now to FIG. 10, a timing diagram of such a migration of a computational unit according to embodiments of the invention is illustrated.

At first, the central control unit 20 may set the respective migrant computational unit to a migrating state in the registry 21.

At a point in time $t_N$, which corresponds to a block height N, the first subnet SNA, e.g. a computational unit manager of the first subnet SNA, may observe the changes in the central registry 21 which indicate/signal that the computational unit $CU_{A4}$ shall be migrated.

Then the computational unit manager may schedule/trigger a migration time/migration block height, in this example the migration block height N+K corresponding to a migration time $t_{N+K}$.

The migration time defines the block height of the last block that is to be processed by the first subnet SNA with the migrant computational unit still being part of the first subnet SNA.

Referring back to FIG. 1, the network 100 is configured to exchange unit-to-unit messages between the computational units of the network via a messaging protocol based on the subnet-assignment.

According to embodiments, the distributed network may be in particular configured to exchange inter-subnet messages 16 between the subnets SNA, SNB, SNC and SND via a messaging protocol. The inter-subnet messages 16 may be in particular embodied as inter-subnet unit-to-unit messages 16*a* to be exchanged between computational units that have been assigned to different subnets according to the subnet-assignment. As an example, the distributed network 100 may be configured to exchange a unit-to-unit message M1, 16*a* between the computational unit $CU_{A1}$ as sending computational unit running on the subnet SNA and the computational unit $CU_{B2}$ as receiving computational unit running on the subnet SNB. In addition, the inter-subnet messages 16 may be embodied as signalling messages 16*b*. The signalling messages 16*b* may encompass acknowledgement messages (ACK) adapted to acknowledge an acceptance or receipt of the unit-to-unit messages or non-acknowledgement messages(NACK) adapted to not-acknowledge an acceptance (corresponding to a rejection) of the unit-to-unit messages, e.g. to indicate a transmission failure.

Figure 12:
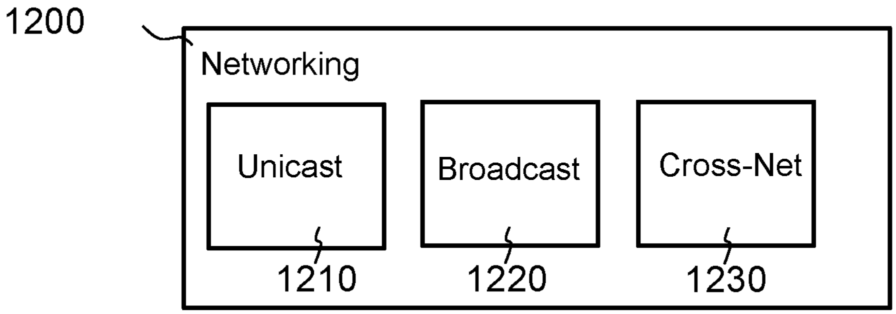
FIG. 12 shows a more detailed view of a networking component.

The network 100 may be in particular configured to store the subnet-assignment of the computational units 10 as network configuration data, e.g. in the networking component 1200 as shown in FIG. 12, in particular in the crossnet component 1230. This information may also be stored in the central registry.

According to further embodiments, the network 100 may be configured to exchange the inter-subnet messages 16 via a messaging protocol and a consensus protocol. The consensus protocol may be configured to reach a consensus on the selection and/or processing order of the inter-subnet messages 16 at the respective receiving subnet.

Referring e.g. to the subnet SNB, it receives inter-subnet messages 16 from the subnets SNA, SNC and SND. The consensus protocol receives and processes these inter-subnet messages 16 and performs a predefined consensus algorithm or consensus mechanism to reach a consensus on the selection and/or processing order of the received inter-subnet messages 16.

Referring now to FIGS. 3*a* to 3*d*, a computer-implemented method for migrating a computational unit from a first subnet to a second subnet will be explained.

More particularly, FIGS. 3*a* to 3*d* show a number of nodes N1, N2 and N3 of a first subnet SNA and a number of nodes N4, N5 and N6 of a second subnet SNB. The first subnet SNA is configured to run an assigned subset of 4 computational units, more particularly the computational units $CU_{A1}$, $CU_{A2}$, $CU_{A3}$ and $CU_{A4}$ and the second subnet SNB is configured to run an assigned subset of 2 computational units, more particularly the computational units $CU_{B1}$ and $CU_{B2}$. The respective set of assigned computational units that runs on a node forms a replica of the subset on the respective node, namely a replica SNA, 310 on the nodes N1, N2 and N3 and a replica SNB, 320 on the nodes N4, N5 and N6. Such a replica may be considered as a partition for the assigned subset of computational units on the nodes of the subnet. In other words, a replica is formed by a set of computational units that runs on a node and is assigned to the same subnet.

Figure 3A:
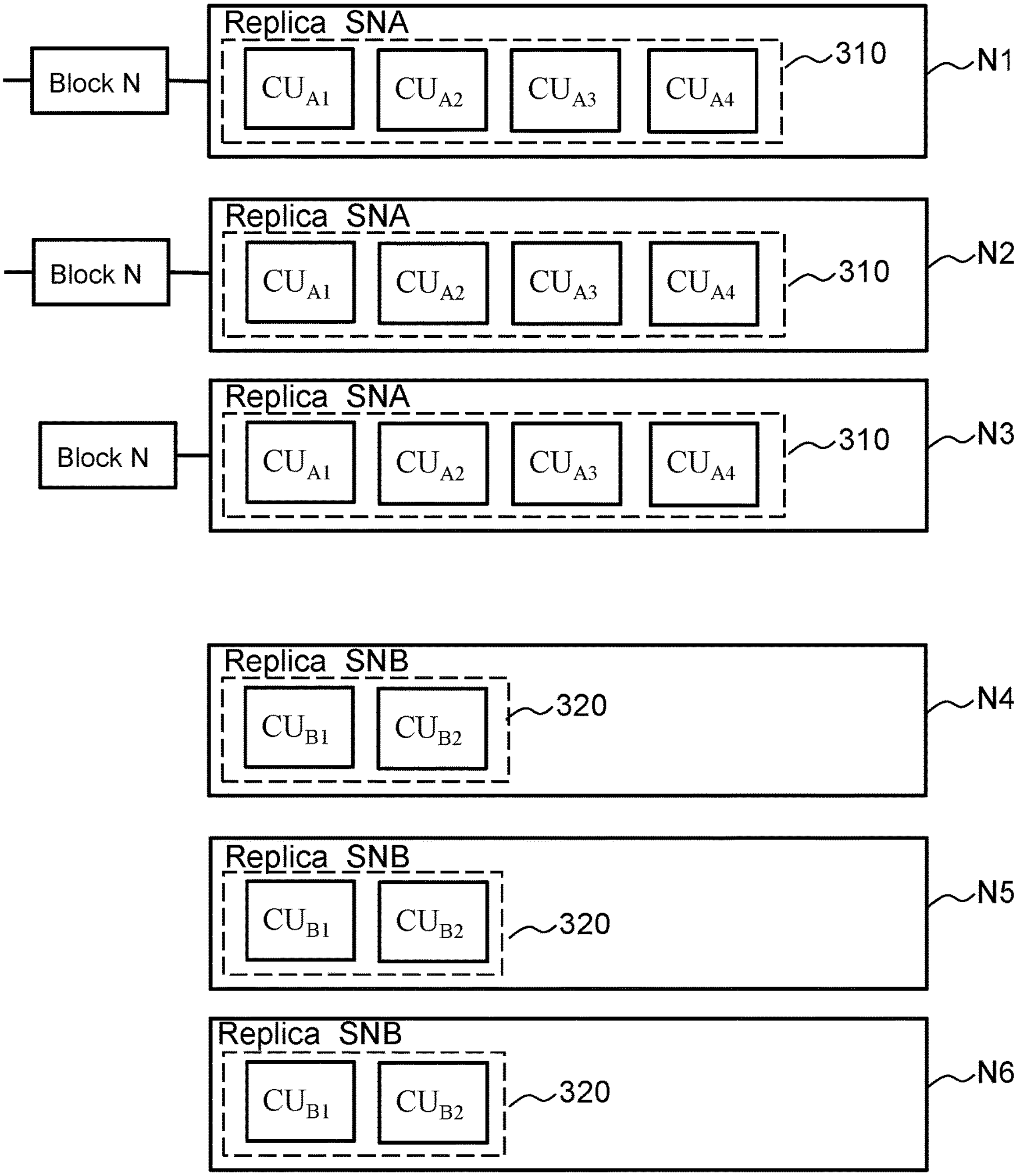
FIGS. 3*a* to 3*d* illustrate steps of a method for migrating a migrant computational unit from a first subnet to a second subnet.

In the example of FIG. 3*a* it is assumed that the subnet SNA operates at a block height N. The subnet SNB may operate at a different block height which is not shown in FIGS. 3*a* to 3*e* for ease of illustration. In the example of FIGS. 3*a* to 3*d* it is assumed that the underlying distributed network migrates the computational unit $CU_{A4}$ from the first subnet SNA to the second subnet SNB for load balancing reasons. To start the migration process, the central control unit 20 signals the intended migration to the first subnet SNA and the second subnet SNB, e.g. by a registry update which sets the computational unit $CU_{A4}$ to a migrating state.

Then, once observed, the computational unit manager of the subnet SNA may schedule a migration time/migration block height. In this example the migration block height is the block height N+K, wherein N is the height where the first subnet/source subnet SNA observes the registry change. The number K may be chosen in dependence on the respective configuration of the distributed network and may be adapted to the needs of the respective distributed network. As an example, K may be e.g. 10, 100 or even 1000 or more block heights. The higher K, the higher is the respective lead time for the involved subnets to prepare the transfer of the computational unit $CUA_4$.

Figure 3B:
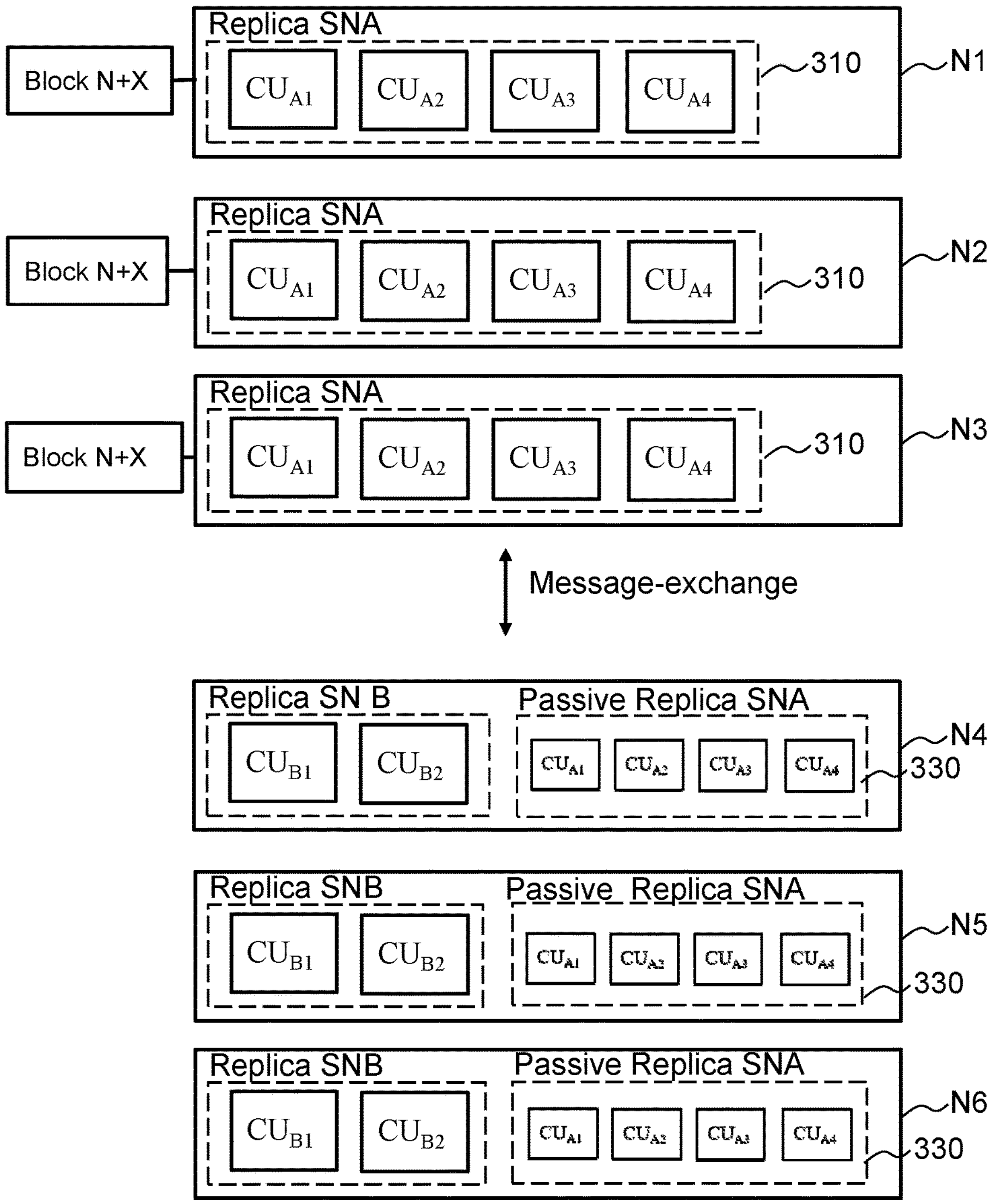

FIG. 3*b* shows the nodes of the subnets SNA and SNB at an intermediate block height N+X of the subnet SNA, wherein X<K, i.e. the migration block height N+K has not been reached and the computational unit $CU_{A4}$ is still going to be processed by the subnet SNA.

In the meantime, the nodes N4, N5 and N6 of the second subnet SNB have joined the first subnet SNA and have started to run the computational units $CU_{A1}$, $CU_{A2}$, $CU_{A3}$ and $CU_{A4}$ as local replicas 330. In other words, the nodes N4, N5 and N6 have created a new partition which is now used to run the computational units of the subnet SNA.

The nodes of the second subnet SNB may run the replicas 310 of the subnet SNA in particular as passive replicas. In other words, they do not fully participate in the subnet SNA, but perform only a limited set of operations of the subnet SNA. In particular, the replicas 310 may be configured to mainly observe the unit states/execution states of the computational units $CU_{A1}$, $CU_{A2}$, $CU_{A3}$ and $CU_{A4}$ in order to be up to date with the states of the computational units $CU_{A1}$, $CU_{A2}$, $CU_{A3}$ and $CU_{A4}$. This passive joining may be in particular used to create an internal trust domain for the unit states of the computational unit $CU_{A4}$. In other words, by observing and partly participating in the subnet SNA, the nodes N4, N5 and N6 use the lead time between the signalling height N and the migration height N+K to pre-transfer already the state of the computational unit $CU_{A4}$ in a trusted manner to their own internal and trusted domain so that they later on only need to keep up with the execution of valid blocks to reach the state at migration height.

Figure 3C:
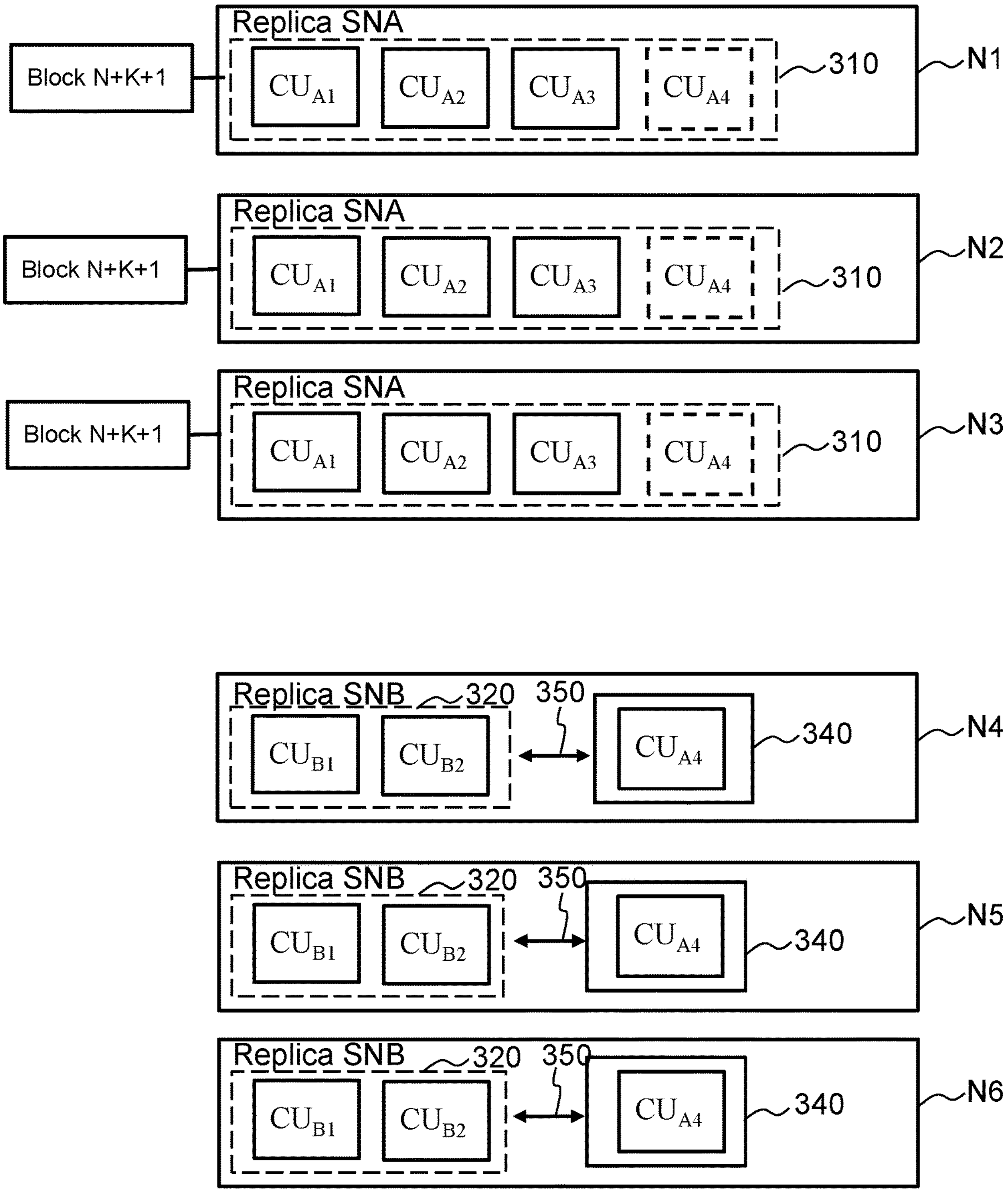

FIG. 3*c* illustrates the nodes of the subnets SNA and SNB at the block height N+K+1 of the subnet SNA. In order to take over the processing of the migrant computational $CU_{A4}$, the nodes N4, N5 and N6 may internally transfer the final state of the computational unit $CUA_4$ at the migration block height N+K which is available in the passive replicas 330. More particularly, the passive replicas 330 may be stopped and the final state of the computational unit $CU_{A4}$ at the block height N+K may be transferred to an internal storage space, e.g. to a directory 340 of the nodes N4, N5 and N6 which is assigned for inbound computational units.

Then the replicas 320 of the subnet SNB may receive or get the state of the computational unit $CUA_4$ from the internal directory 340 via some internal and trusted communication mechanism 350. Then the replicas 320 may agree on activating the computational unit $CU_{A4}$ and start to run the computational unit $CU_{A4}$ on the subnet SNB, in particular on the corresponding replicas 320 of the nodes N4, N5 and N6 for the subnet SNB.

During some transition time, the nodes of the first subnet SNA may still comprise a copy of the computational unit $CU_{A4}$. The copy may be just a passive copy, i.e. the computational unit $CU_{A4}$ is not actively run anymore by the replicas SNA of the nodes N1, N2 and N3. This is indicated by the dotted lines of the computational unit $CU_{A4}$ in FIG. 3*c*.

Figure 3D:
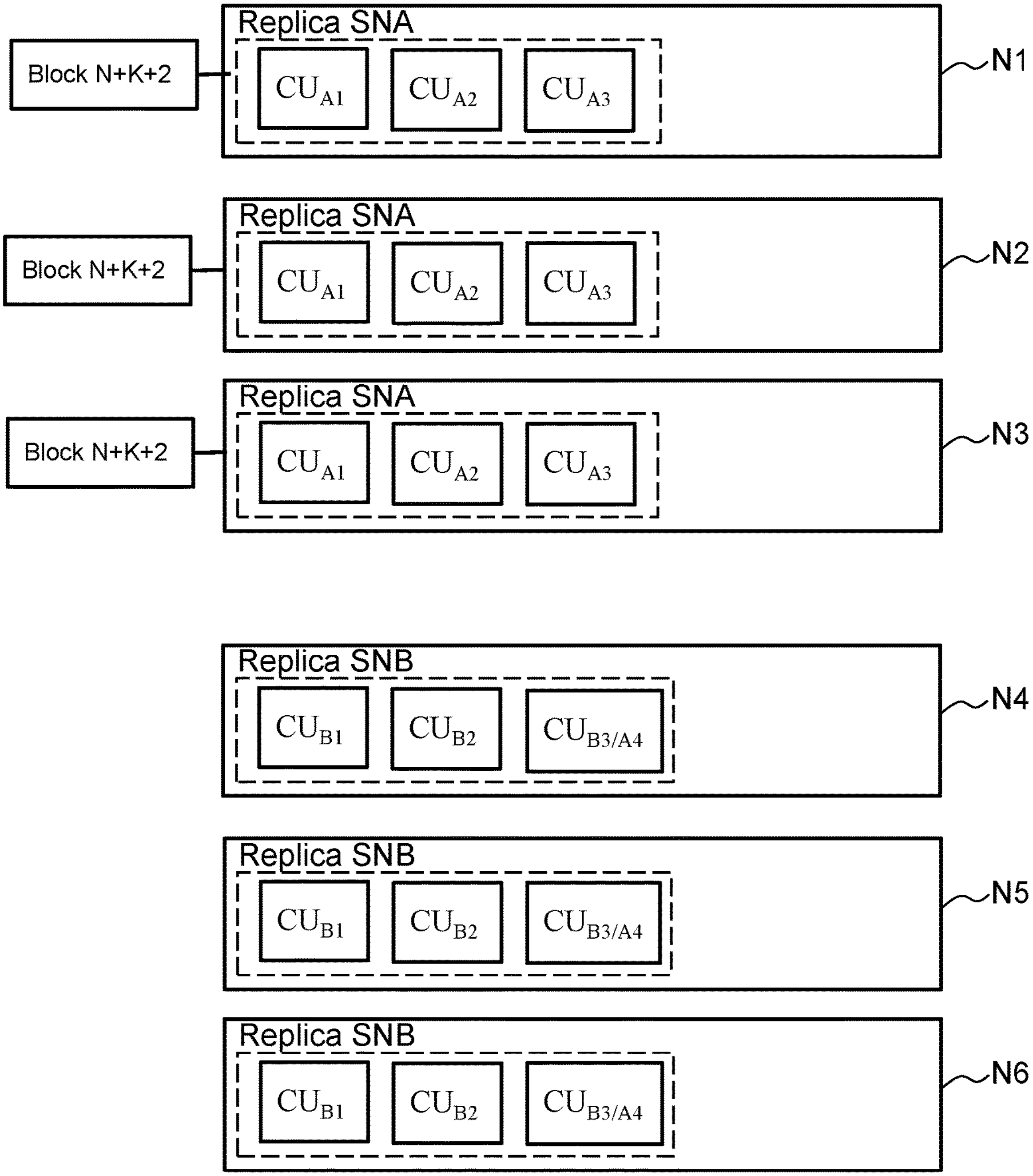

FIG. 3*d* illustrates the nodes of the subnets SNA and SNB at the block height N+K+2.

Now the nodes of the first subnet SNA have completely deleted the computational unit $CU_{A4}$ and only run the replicas SNA, 310 of the subnet SNA with the computational units $CU_{A1}$, $CU_{A2}$ and $CU_{A3}$.

Furthermore, the computational unit $CU_{A4}$ has been fully integrated in the subnet SNB and is run by the replicas SNB, 320 of the nodes N4, N5 and N6. The migrant computational unit is denoted in FIG. 3*d* with $CU_{B3/A4}$ to indicate that the former computational unit $CU_{A4}$ is now run on subnet SNB as third computational unit.

Figure 3E:
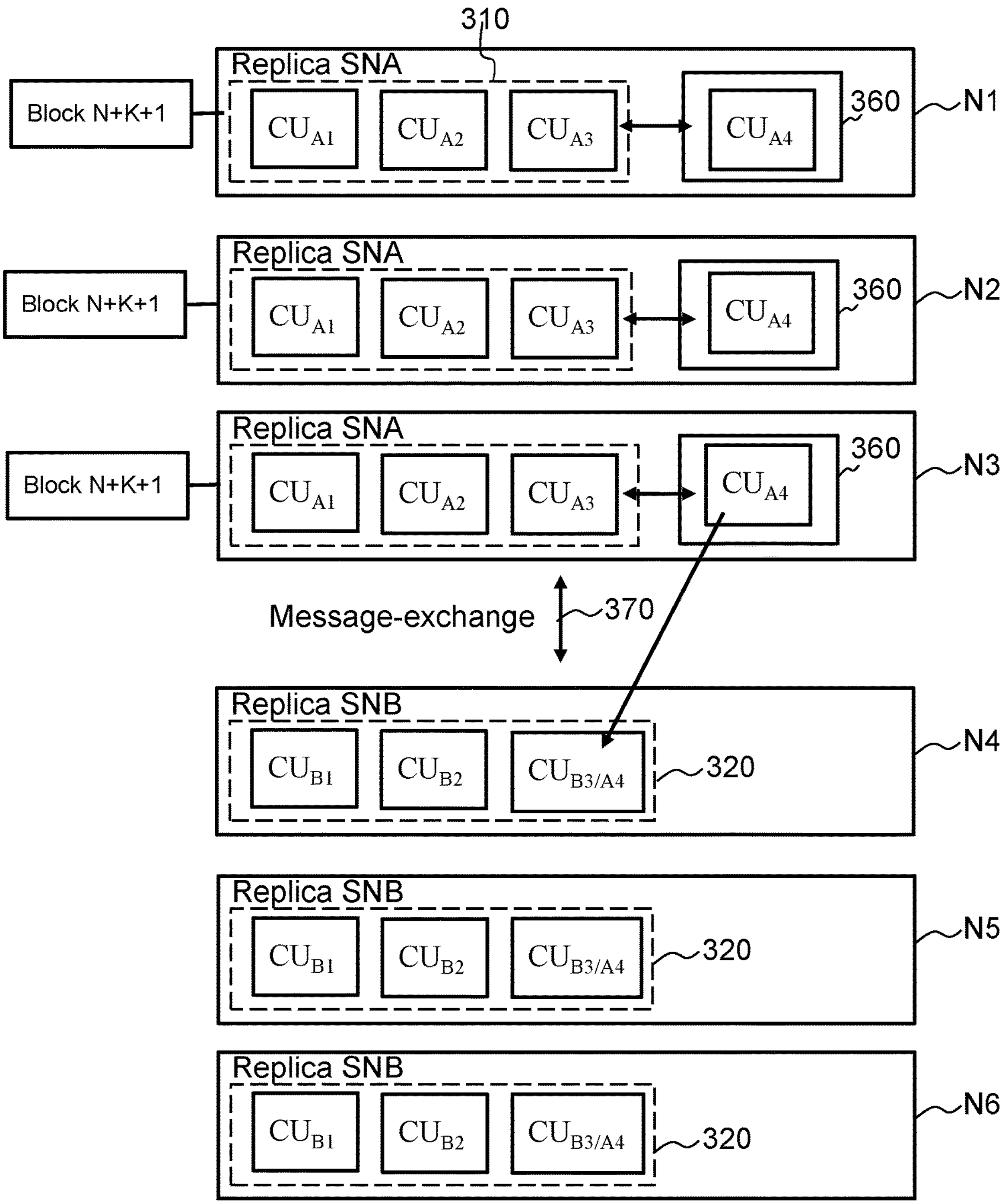
FIG. 3*e* illustrates another mechanism to migrate a migrant computational unit.

Referring now to FIG. 3*e*, another mechanism to transfer the migrant computational unit $CU_{A4}$ is explained. The example illustrated in FIG. 3*e* starts from the initial setting as shown in FIG. 3*a*. FIG. 3*e* shows the nodes N1-N6 at the block height N+K+1. After the block N+K has been processed by the nodes N1, N2 and N3, the migrant computational unit $CU_{A4}$ and its corresponding final state is transferred within the nodes N1, N2 and N3 from the replicas SNA, 310 to a dedicated storage space, e.g. to a directory 360 of the nodes N1, N2 and N3 which is assigned for outbound computational units.

Then the replicas 320 of the subnet SNB may receive or get the state of the computational unit $CUA_4$ from the directory 360 via a messaging protocol 370 which establishes an inter-subnet communication mechanism between the subnets SNA and SNB. According to such an embodiment the nodes N4, N5 and N6 of the second subnet SNB have not joined the first subnet. After the migration height N+K has been reached, the first subnet SNA has prepared the migrant computational unit $CU_{A4}$ for migration and placed it in the directory 360. According to embodiments the computational unit $CU_{A4}$ at the migration block height N+K that is placed in the directory 360 may be certified by the nodes N1, N2 and N3, e.g. by a joint signature. After having received the certified computational unit $CU_{A4}$, the replicas 320 may agree on the activation and start to run the computational unit $CU_{A4}$ on the subnet SNB. As a result, the nodes N4, N5 and N6 may process the computational unit $CU_{B3/A4}$ as part of their subnet SNB.

Referring now to FIGS. 4*a* to 4*g*, a computer-implemented method for migrating a computational unit from a first subnet to a second subnet according to another embodiment of the invention will be explained.

Figure 4A:
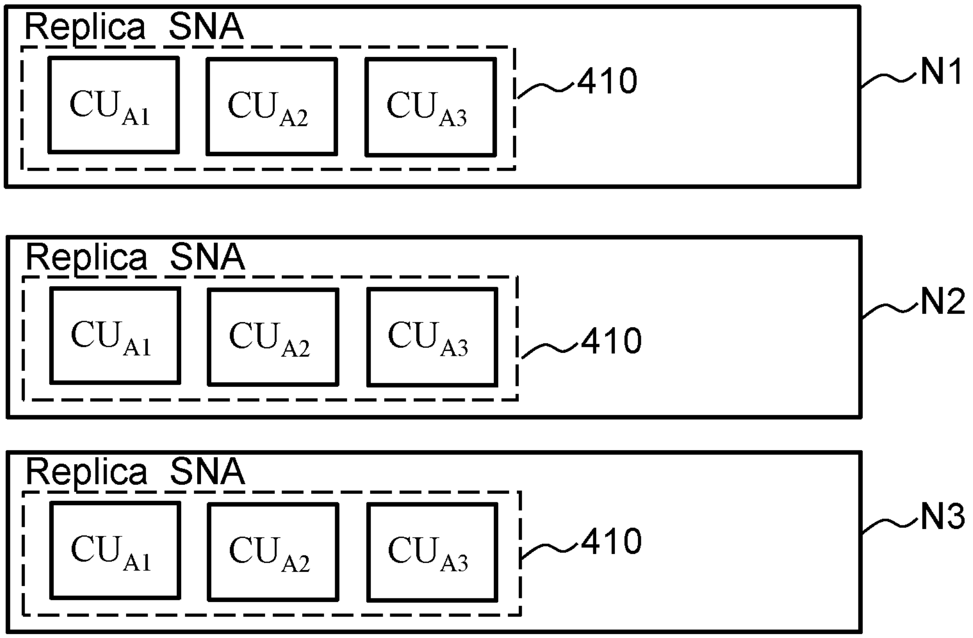
FIGS. 4*a* to 4*g* illustrate steps of a computer-implemented method for migrating a computational unit from a first subnet to a second subnet which is not pre-existing.

FIG. 4*a* shows a number of nodes N1, N2 and N3 of a first subnet SNA. The first subnet SNA is configured to run an assigned subset of 3 computational units, more particularly the computational units $CU_{A1}$, $CU_{A2}$, and $CU_{A3}$.

According to the embodiment illustrated in FIGS. 4*a* to 4*g*, the distributed network is operated to migrate the computational unit $CU_{A3}$ of the first subnet SNA to a subnet SNB that is not pre-existing, i.e. to a subnet SNB that has to be newly created.

To start the migration process, the central control unit 20 signals the intended migration to the first subnet SNA, e.g. by a registry update which sets the computational unit $CU_{A3}$ to a migrating state. Accordingly, the computational unit $CU_{A3}$ may be again denoted as migrant computational unit. Furthermore, e.g. the central control unit 20 or the computational unit manager of the subnet SNA or another entity or mechanism schedules the migration time/migration block height.

Figure 4B:
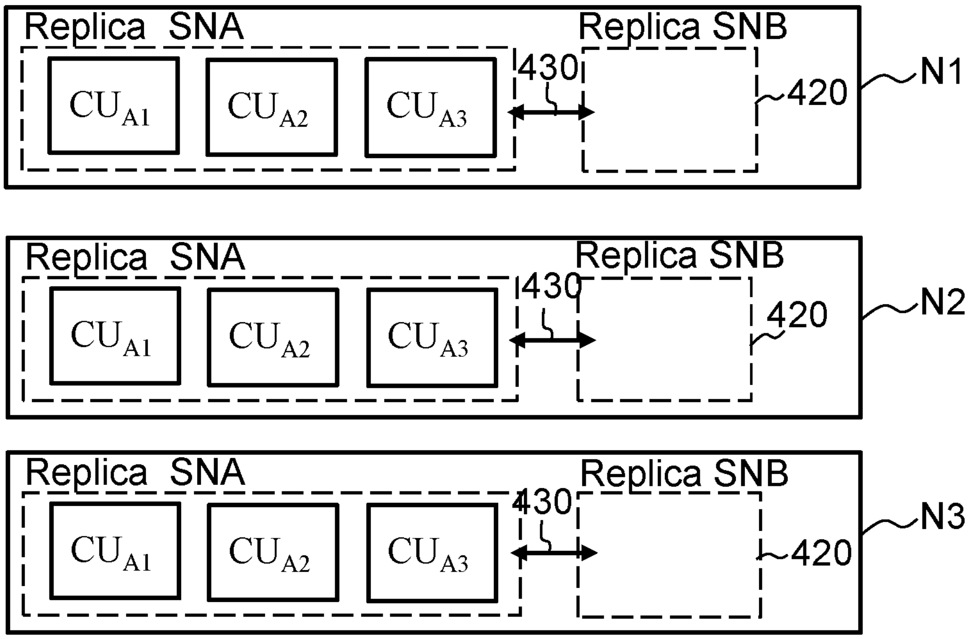

Then, and as illustrated in FIG. 4*b*, the nodes N1, N2 and N3 of the first subnet SNA create a new second subnet SNB and start to run the new second subnet SNB. This comprises to create a new partition on the Nodes N1, N2 and N3 for the second subnet SNB. Accordingly, each of the nodes N1, N2 and N3 have created a new replica SNB, 420 for the subnet SNB. Then the nodes N1, N2 and N3 may stop to run the migrant computational unit on the first subnet SNA.

Figure 4C:
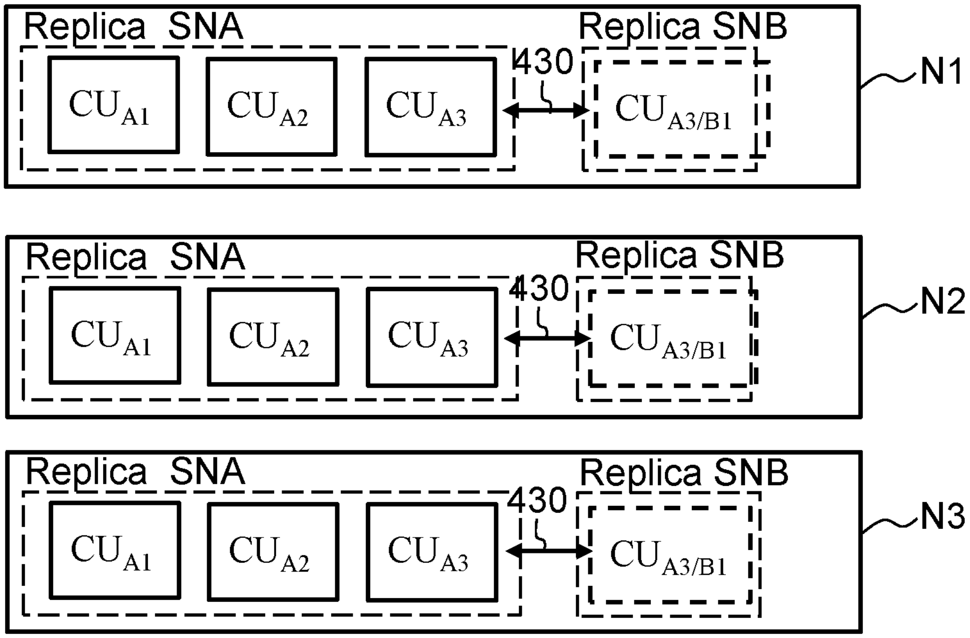

As a next step, as shown in FIG. 4*c*, the nodes N1, N2 and N3 agree to activate the migrant computational unit $CU_{A3/B1}$ and start to run the migrant computational unit $CU_{A3/B1}$ of the first subnet SNA which shall be transferred to the new subnet SNB as first computational unit. Accordingly, the migrant computational unit is denoted in the following as $CU_{A3/B1}$.

As the nodes N1, N2 and N3 run both subnets SNA and SNB, the state of the computational unit $CU_{A3}$ may be transferred internally to the computational unit $CU_{A3/B1}$ within the same node and hence within the same trust domain from the replica SNA, 410 to the replica SNB, 420.

As both replicas SNA and SNB run on the same node, the replica SNB has according to embodiments only to wait until the first replica SNA has agreed on a final state of the computational unit $CU_{A3}$ at the migration block height N+K. Then the replica SNB may receive this state of the computational unit $CU_{A3}$ from the first replica SNA of the same node via a node-internal communication mechanism 430. As an example, the replica SNA may put the computational unit $CU_{A3}$ in a dedicated directory of the file system of the respective node where it can be picked up by the replica SNB. Once the migrant computational unit $CU_{A3/B1}$ has been transferred via the internal communication or transfer mechanism 430, the nodes N1, N2 and N3 may install, agree to activate, activate and run the migrant computational unit $CU_{A3/B1}$ on the newly created second subnet SNB.

Figure 4D:
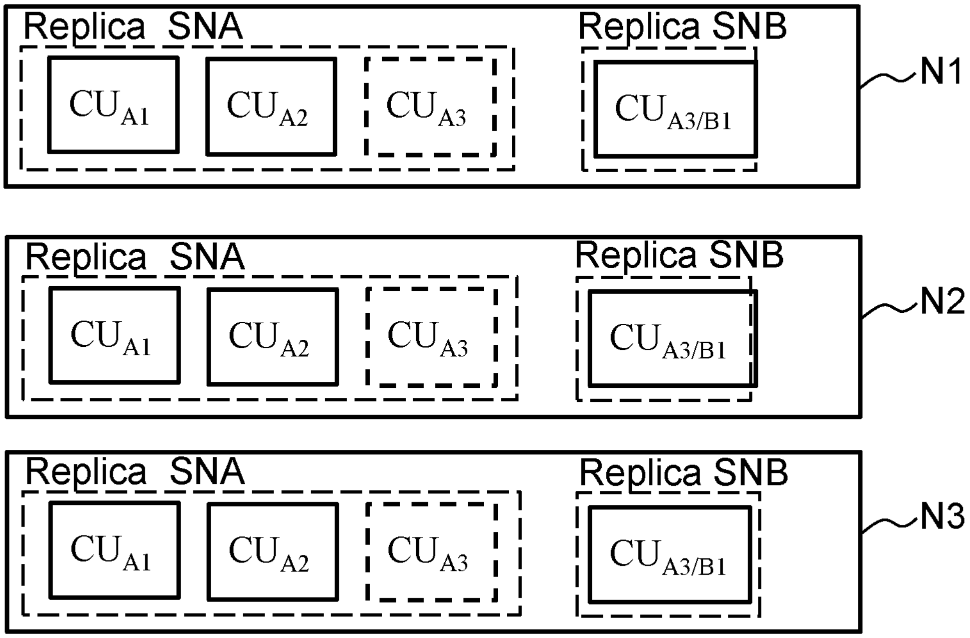

FIG. 4*d* illustrates a transitioning period during which the computational unit $CU_{A3}$ is still held by the replica SNA, 410 in an inactive mode, while at the same time the migrated computational unit $CU_{A3/B1}$ is already run on the new replica SNB, 420.

Figure 4E:
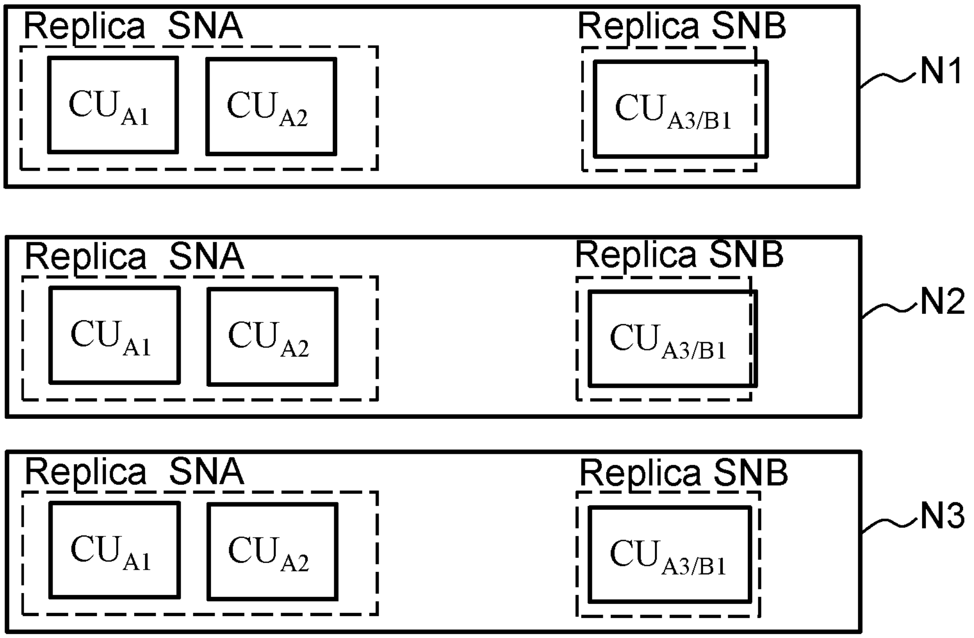

FIG. 4*e* illustrates the nodes N1, N2 and N3, wherein the migrant computational unit $CU_{A3}$ has been removed from the replica SNA, while the migrant computational unit $CU_{A3/B1}$ is run on the new replica SNB on the nodes N1, N2 and N3.

Figure 4F:
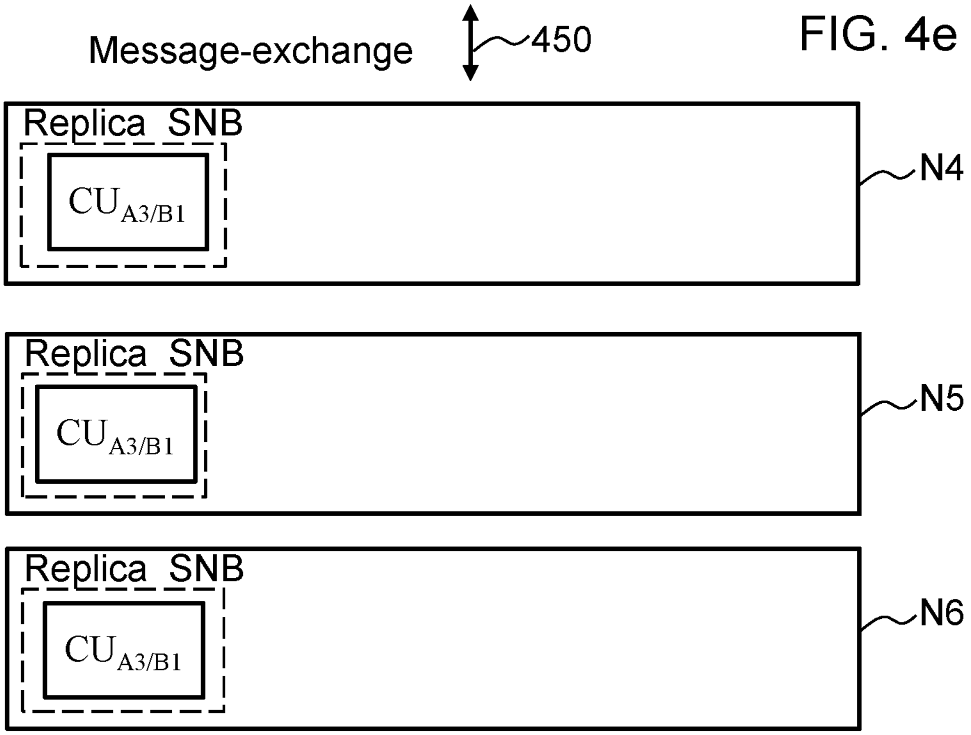

FIG. 4*f* illustrates a new set of nodes comprising additional or fresh nodes N4, N5 and N6 which have been added to the second subnet SNB and which have started to run the migrant computational unit $CU_{A3/B1}$ on respective replicas SNB of the second subnet SNB. The new or fresh nodes N4, N5 and N6 may receive the migrant computational unit $CU_{A3/B1}$ via a transfer mechanism 450 from the nodes N1, N2 and N3. This transfer of the migrant computational unit may be performed by some messaging protocol between the nodes, e.g. a state synchronisations protocol. As this transfer of the computational unit $CU_{A3/B1}$ takes place between different nodes, i.e. between two different trust domains, the state of the computational unit $CU_{A3/B1}$ is transferred in a certified way, e.g. with a joint signature of the nodes N1, N2 and N3.

According to embodiments this mechanism of adding fresh nodes may rely on a protocol for joining a subnet and for catching up with the whole state of the subnet.

Figure 4G:
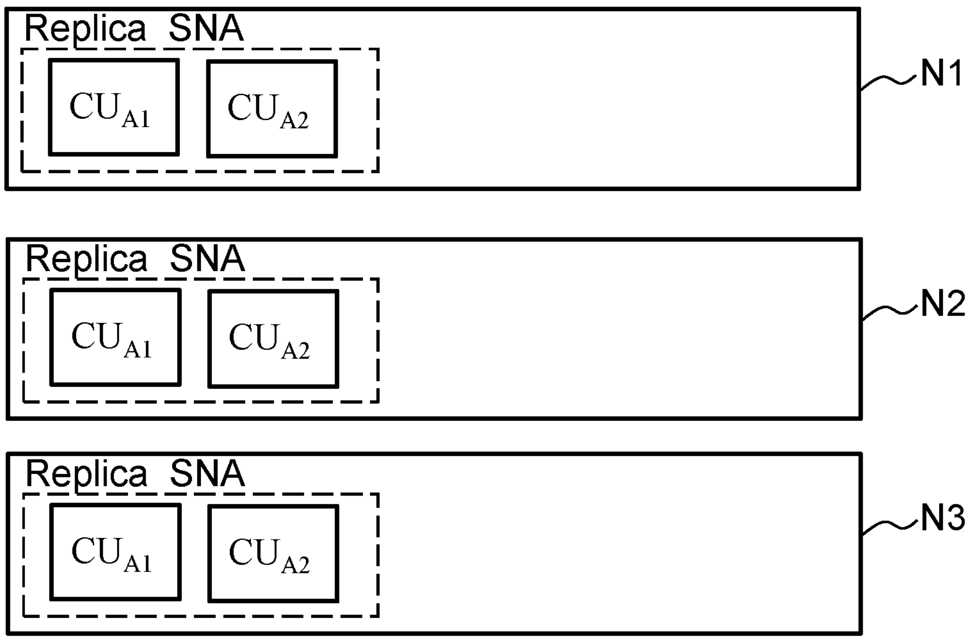

FIG. 4*g* illustrates the nodes N1, N2 and N3, wherein the migrant computational unit $CU_{A3}$ has been removed from the replica SNA, while the migrant computational unit $CU_{A3/B1}$ is now only run on the new replicas SNB of the additional or fresh nodes N4, N5 and N6.

The mechanism as explained with reference to FIGS. 4*a* to 4*g* uses a kind of "spin-off" approach for migrating a migrant computational unit. First the nodes that initially run the migrant computational unit start themselves a new subnet as separate partition. Then they transfer the migrant computational unit internally within the nodes to the newly created partition which establishes a newly created subnet. This transfer takes place within the same trust domain. Then new nodes may be added to the newly created second subnet and may subsequently take over the operation of the newly created second subnet, while the former nodes of the first subnet may leave the second subnet. This approach has the advantage that the initial transfer of the migrant computational unit from the first subnet to the second subnet take place internally within the corresponding nodes and hence within the same trust domain. Furthermore, only the migrant computational unit $CU_{A3/B1}$ has to be transferred via the transfer mechanism 450 between different nodes over the network. This may facilitate a smooth, efficient and quick transfer of the migrant computational unit.

Figure 5:
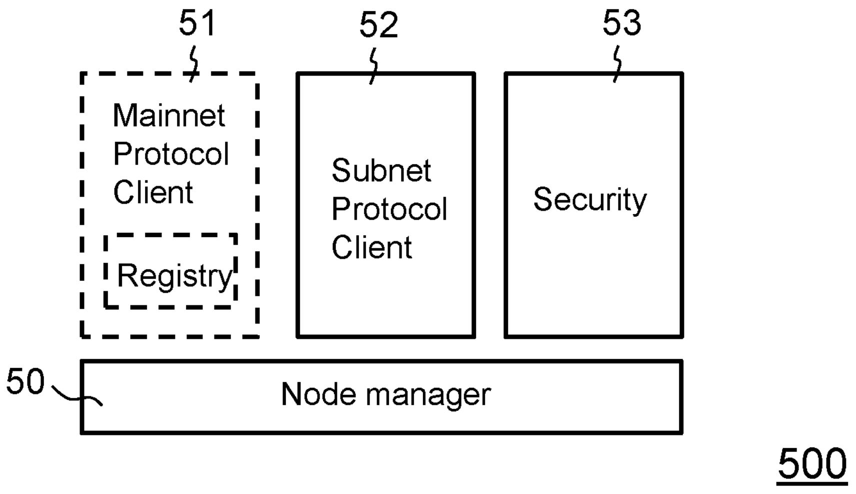
FIG. 5 illustrates main processes which are run on each node of the network according to an embodiment of the invention.

FIG. 5 illustrates main processes which may be run on each node 10 of the network 100 according to an embodiment of the invention. A network client of networks according to embodiments of the invention is the set of protocol components that are necessary for a node 10 to participate in the network. According to embodiments, each node 10 is a member of a mainnet. Furthermore, each node may be a member of one or more subnets.

A node manager 50 is configured to start, restart and update a mainnet protocol client 51, a subnet protocol client 52 and a security application 53. According to other embodiments, the central control unit 20 may be used instead of the mainnet protocol client (see FIG. 1). According to embodiments several subnet protocol clients may be used, thereby implementing several replicas.

According to embodiments, each of the plurality of subnets 11 is configured to run a separate subnet protocol client 52 on its corresponding nodes 10. The mainnet protocol client 51 is in particular configured to distribute configuration data to and between the plurality of subnets 11. The mainnet protocol client 51 may be in particular configured to run only system computational units, but not any user-provided computational units. The mainnet protocol client 51 is the local client of the mainnet and the subnet protocol client 52 is the local client of the subnet.

The security application 53 stores secret keys of the nodes 10 and performs corresponding operations with them.

The node manager 50 may monitor e.g. the registry 21 of the control unit 20, it may instruct the nodes to participate in a subnet, it may move a computational unit to a partition of the node which participates in the second subnet and/or it may instruct the nodes to stop participation in a subnet.

Figure 6:
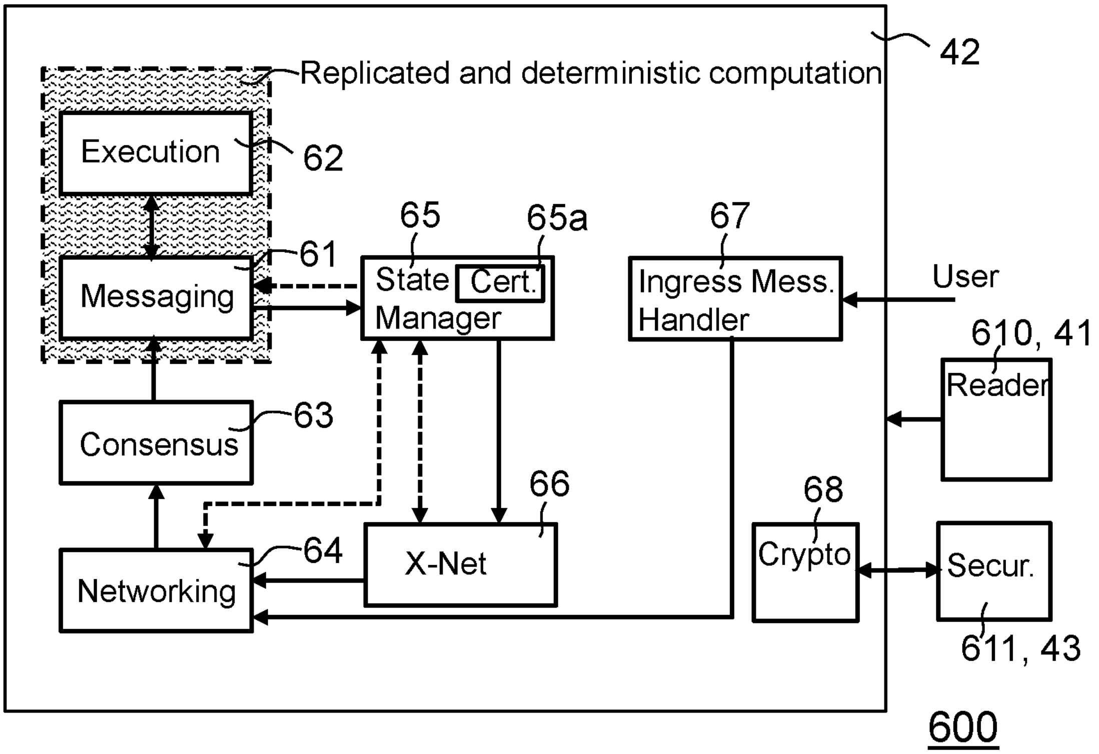
FIG. 6 shows a schematic block diagram of protocol components of a subnet protocol client.

FIG. 6 shows a schematic block diagram of protocol components 600 of a subnet protocol client, e.g. of the subnet protocol client 52 of FIG. 5.

Full arrows in FIG. 6 are related to unit-to-unit messages and ingress messages. Dashed arrows relate to system information.

The protocol components 600 comprise a messaging component 61 which is configured to run the messaging protocol and an execution component 62 configured to run an execution protocol for executing execution messages, in particular for executing unit-to-unit messages and/or ingress messages. The protocol components 600 further comprise a consensus component 63 configured to run a consensus protocol, a networking component 64 configured to run a networking protocol, a state manager component 65 configured to run a state manager protocol, an X-Net component 66 configured to run a cross-subnet transfer protocol and an ingress message handler component 67 configured to handle ingress message received from an external user of the network. The protocol components 600 comprise in addition a crypto-component 68. The crypto-component 68 co-operates with a security component 611, which may be e.g. embodied as the security application 53 as described with reference to FIG. 5. Furthermore, the subnet-protocol client 52 may cooperate with a reader component 610, which may be a part of the mainnet protocol client 51 as described with reference to FIG. 5. The reader component 610 may provide information that is stored and distributed by the mainnet to the respective subnet protocol client 52. This includes the assignment of nodes to subnets, node public keys, assignment of computational units to subnets etc.

The messaging component 61 and the execution component 62 are configured such that all computation, data and state in these components is identically replicated across all nodes of the respective subnet, more particularly all honest nodes of the respective subnet. This is indicated by the wave-pattern background of these components.

Such an identical replication is achieved according to embodiments on the one hand by virtue of the consensus component 63 that ensures that the stream of inputs to the messaging component 61 is agreed upon by the respective subnet and thus identical for all nodes, more particularly by all honest nodes. On the other hand, this is achieved by the fact that the messaging component 61 and the execution component 62 are configured to perform a deterministic and replicated computation.

The X-Net Transfer component 66 sends message streams to other subnets and receives message streams from other subnets.

Most components will access the crypto component 68 to execute cryptographic algorithms and the mainnet reader 70 for reading configuration information.

The execution component 62 receives from the messaging component 61 a unit state of the computational unit and an incoming message for the computational unit, and returns an outgoing message and the updated unit state of the computational unit. While performing the execution, it may also measure a gas consumption of the processed message (query).

The messaging component 61 is clocked by the input blocks received from the consensus component 63. That is, for each input block, the messaging component 61 performs steps as follows. It parses the respective input blocks to obtain the messages for its computational units. Furthermore, it routes the messages to the respective input queues of the different computational units and schedules messages to be executed according to the capacity each computational unit got assigned. Then it uses the execution component 62 to process a message by the corresponding computational unit, resulting in messages to be sent being added to an output queue of the respective computational unit. However, when the message is destined to a computational unit on the same subnet it may be put directly in the input queue of the corresponding computational unit. The messaging component 61 finally routes the messages of the output queues of the computational units into message streams for subnets on which the receiving computational units are located and forwards these message streams to the state manager component 65 to be certified, i.e., signed by the respective subnet.

The state manager component 65 comprises a certification component 65*a*. The certification component 65*a* is configured to certify the output streams of the respective subnet. This may be performed e.g. by a threshold-signature, a multi-signature or a collection of individual signatures of the computational units of the respective subnet.

Figure 7:
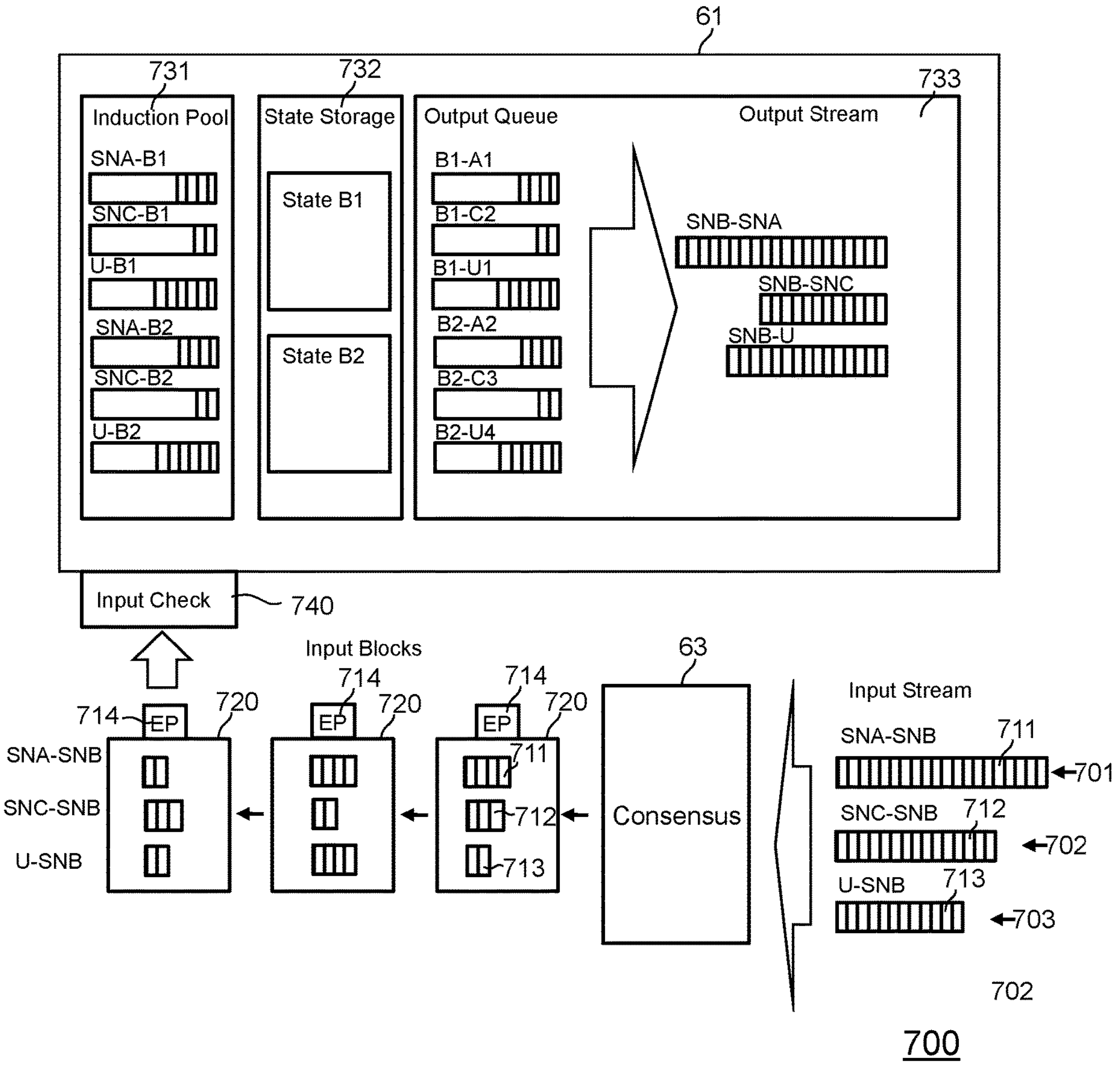
FIG. 7 shows an exemplary visualization of a workflow of a messaging protocol and a consensus protocol and the associated components.

FIG. 7 shows an exemplary visualization of a workflow 700 of the messaging protocol and the consensus protocol and the associated components, e.g. of the messaging component 61 and the consensus component 63 of FIG. 6. More particularly, FIG. 7 visualizes the workflow of inter-subnet messages exchanged between a subnet SNB and subnets SNA and SNC. Furthermore, the subnet SNB exchanges ingress messages with a plurality of user U.

Starting from the bottom right of FIG. 7, a plurality of input streams 701, 702 and 703 is received by a consensus component 63. The consensus component 63 is a subnet consensus component that is run by a subnet client of the subnet SNB. The input stream 701 comprises inter-subnet messages 711 from the subnet SNA to the Subnet SNB. The input stream 702 comprises inter-subnet messages 712 from the subnet SNC to the Subnet SNB. The input stream 703 comprises ingress messages 713 from the plurality of users U to the subnet SNB.

The inter-subnet messages 711 and 712 comprise inter-subnet unit-to-unit messages to be exchanged between the computational units of the different subnets as well as signalling messages. The signalling messages are used to acknowledge or not acknowledge an acceptance of unit-to-unit messages. The messaging component 61 is configured to send the signalling messages from a receiving subnet to a corresponding sending subnet, i.e. in this example from the subnet SNB to the subnets SNA and SNC. The messaging component 61 is according to this example configured to store the sent inter-subnet unit-to-unit messages until an acknowledgement message has been received for the respective unit-to-unit message. This provides a guaranteed delivery.

The consensus component 63 is configured to receive and process the inter-subnet messages 711, 712 of the subnets SNA, SNC and the ingress messages 713 of the users U and to generate a queue of input blocks 720 from the inter-subnet messages 711, 712 and the ingress messages 713 according to a predefined consensus mechanism that is executed by the corresponding consensus protocol. Each input block 720 produced by consensus contains a set of ingress messages 713, a set of inter-subnet messages 711, 712 and execution parameters 714, EP. The execution parameters 714, EP may include in particular a random seed, a designated execution time and/or a height index. The consensus component 63 may also vary the number of messages in every input block based on the current load of the subnet.

The consensus component 63 provides the queue of input blocks 720 then to the messaging component 61 which is configured to execute the messaging protocol and to process the input blocks 720.

The messaging protocol and the messaging component 61 are clocked by the input blocks 720 received from the consensus component 63.

Before processing the received input blocks, the messaging component 61 may perform one or more preprocessing steps including one or more input checks. The input checks may be performed by an input check component 740.

If the input checks have been passed successfully, the messages of the respective input block 720 may be further processed by the messaging component 61 and the corresponding messages may be appended to a corresponding queue in an induction pool of an induction pool component 731. The induction pool component 731 of the messaging component 61 receives input blocks and input messages that have been successfully passed the input check component 740 and have accordingly been accepted by the messaging component 61 for further processing.

In general, the messaging component 61 preprocesses the input blocks 720 by placing ingress messages, signalling messages and inter-subnet messages into the induction pool component 731 as appropriate. Signalling messages in the subnet streams are treated as acknowledgements of messages of the output queues which can be purged.

In this example, the induction pool component 731 comprises subnet-to-unit queues SNA-B1, SNC-B1, SNA-B2 and SNC-B2 as well as user-to-unit queues U-B1 and U-B2.

Following these pre-processing steps, the messaging component 61 invokes the execution component 62 (see FIG. 6) to execute as much of the induction pool as is feasible during a single execution cycle, providing the designated execution time and the random seed as additional inputs. Following the execution cycle, a resulting output queue of messages, which may also be denoted as output messages, is fed to an output queue component 733. Initially the output queue component 733 comprises unit-to-unit and unit-to-user output queues, in this example the unit-to-unit output queues B1-A1, B1-C2, B2-A2 and B2-C3 and the unit-to-user output queues B1-U1 and B2-U4. As an example, the messages B1-A1 denote output messages from the computational unit B1 of subnet SNB to the computational unit A1 of subnet SNA. As another example, the messages B1-U1 denote output messages from the computational unit B1 of subnet SNB to the user U1.

The output queue component 733 post-processes the resulting output queue of the output messages by forming a set of per-subnet output streams to be certified, e.g. by the certification component 65*a* as shown in FIG. 6, and disseminated by other components. In this example, the per-subnet output streams SNB-SNA, SNB-SNC and SNB-U are provided.

Hence the messaging component 61 further comprises a state storage component 732 that is configured to store the state/unit state of the computational units of the respective subnet, in this example the states of the computational units B1 and B2 of the subnet SNB. The corresponding unit state is the working memory of each computational unit.

The messaging component 61 revolves around mutating certain pieces of system state deterministically. In each round, the execution component 61 will execute certain messages from the induction pool by reading and updating the state of the respective computational unit and return any outgoing messages the executed computational unit wants to send. These outgoing messages or in other words output messages go into the output queue component 733, which initially contains unit-to unit messages between computational units of the network. While intra-subnet messages between computational units of the same subnet may be routed and distributed internally within the respective subnet, inter-subnet messages are routed into output streams sorted by subnet-destinations.

In addition, two pieces of state may be maintained according to embodiments to inform the rest of the system about which messages have been processed. A first piece may be maintained for inter-subnet messages and a second piece of state for ingress messages.

In the following the interactions between the mainnet protocol clients 51 and the subnet protocol clients 52 is described in more detail (see FIG. 5). The mainnet protocol clients 51 manages a number of registries that contain configuration information for the subnets. These registries are implemented by computational units on the mainnet. As mentioned according to other embodiments the central registry may be used instead of the mainnet.

Figure 8:
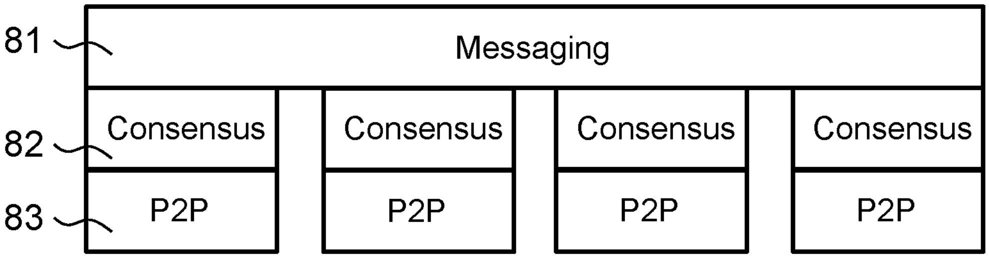
FIG. 8 shows a layer model illustrating main layers which are involved in the exchange of inter-subnet and intra-subnet messages.

FIG. 8 shows a layer model 800 illustrating main layers which are involved in the exchange of inter-subnet and intra-subnet messages. The layer model 800 comprises a messaging layer 81 which is configured to serve as an upper layer for the inter-subnet communication. More particularly, the messaging layer 81 is configured to route inter subnet messages between computational units of different subnets. Furthermore, the messaging layer 81 is configured to route ingress messages from users of the network to computational units of the network.

The layer model 800 further comprises a plurality of consensus layers 82 which are configured to receive inter-subnet messages from different subnets as well as ingress messages and to organize them, in particular by agreeing on a processing order, in a sequence of input blocks which are then further processed by the respective subnet. In addition, the layer model 800 comprises a peer-to-peer (P2P) layer that is configured to organize and drive communication between the nodes of a single subnet.

According to embodiments, the network may comprise a plurality of further layers, in particular an execution layer which is configured to execute execution messages on the computational units of the network.

Figure 9:
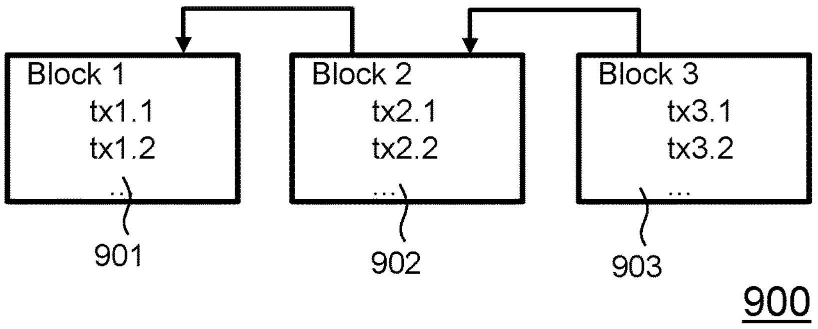
FIG. 9 illustrates the creation of input blocks by a consensus component according to an exemplary embodiment of the invention.

Referring now to FIG. 9, the creation of blocks in distributed networks according to embodiments of the invention is illustrated. The blocks may be in particular the input blocks 720 shown in FIG. 7 which are created by the consensus component 63 that runs the consensus protocol, in particular a local subnet consensus protocol.

In this exemplary embodiment three input blocks 901, 902 and 903 are illustrated. Block 901 comprises a plurality of transactions, namely the transactions tx1.1, tx1.2 and possibly further transactions indicated with dots. Block 902 comprises also a plurality of transactions, namely the transactions tx2.1, tx2.2 and possibly further transactions indicated with dots. Block 903 also comprises a plurality of transactions, namely the transactions tx3.1, tx3.2 and possibly further transactions indicated with dots. The input blocks 901, 902 and 903 are chained together. More particularly, each of the blocks comprises a block hash of the previous block. This cryptographically ties the current block to the previous block(s).

According to embodiments the transactions may be inter-subnet messages, ingress messages and signalling messages.

According to embodiments, the input blocks 901, 902 and 903 may be created by a proof-of-stake consensus-protocol.

However, it should be noted that the input blocks generated by the consensus component do not need to be chained together according to embodiments. Rather any consensus protocol that reaches some kind of consensus between the nodes of a subnet on the processing order of received messages may be used according to embodiments.

Figure 11:
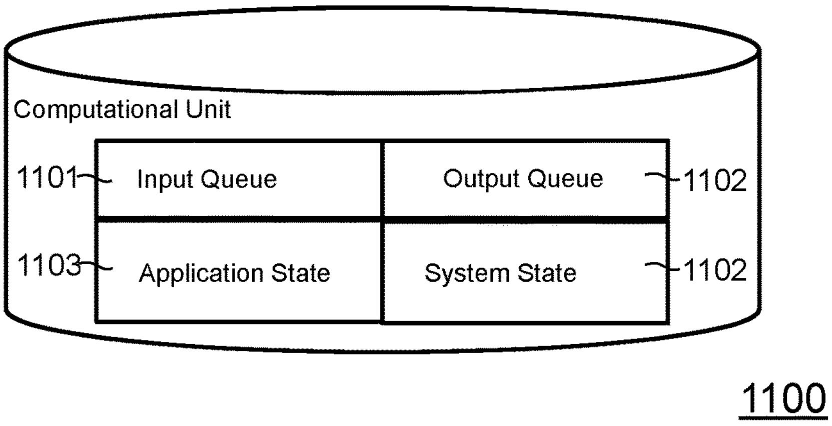
FIG. 11 shows a more detailed illustration of a computational unit.

FIG. 11 shows a more detailed illustration of a computational unit 1100 according to an embodiment of the invention.

The computational unit 1110 comprises an input queue 1101, an output queue 1102, an application state 1103 and a system state 1104.

The computational unit 1100 generally comprises the code of the computational unit and the unit state/execution state of the computational unit.

FIG. 12 shows a more detailed view of a networking component 1200, which is configured to run a networking protocol. The networking component 1200 may be e.g. a more detailed embodiment of the networking component 64 shown in FIG. 6. The networking component 1200 comprises a unicast component 1210 configured to perform a node-to-node communication, a broadcast component 1220 configured to perform an intra-subnet communication and a cross-net component 1230 configured to perform an inter-subnet communication. The cross-net component 1230 may store the subnet-assignment of the computational units as network configuration data or read it from a central registry.

Figure 13:
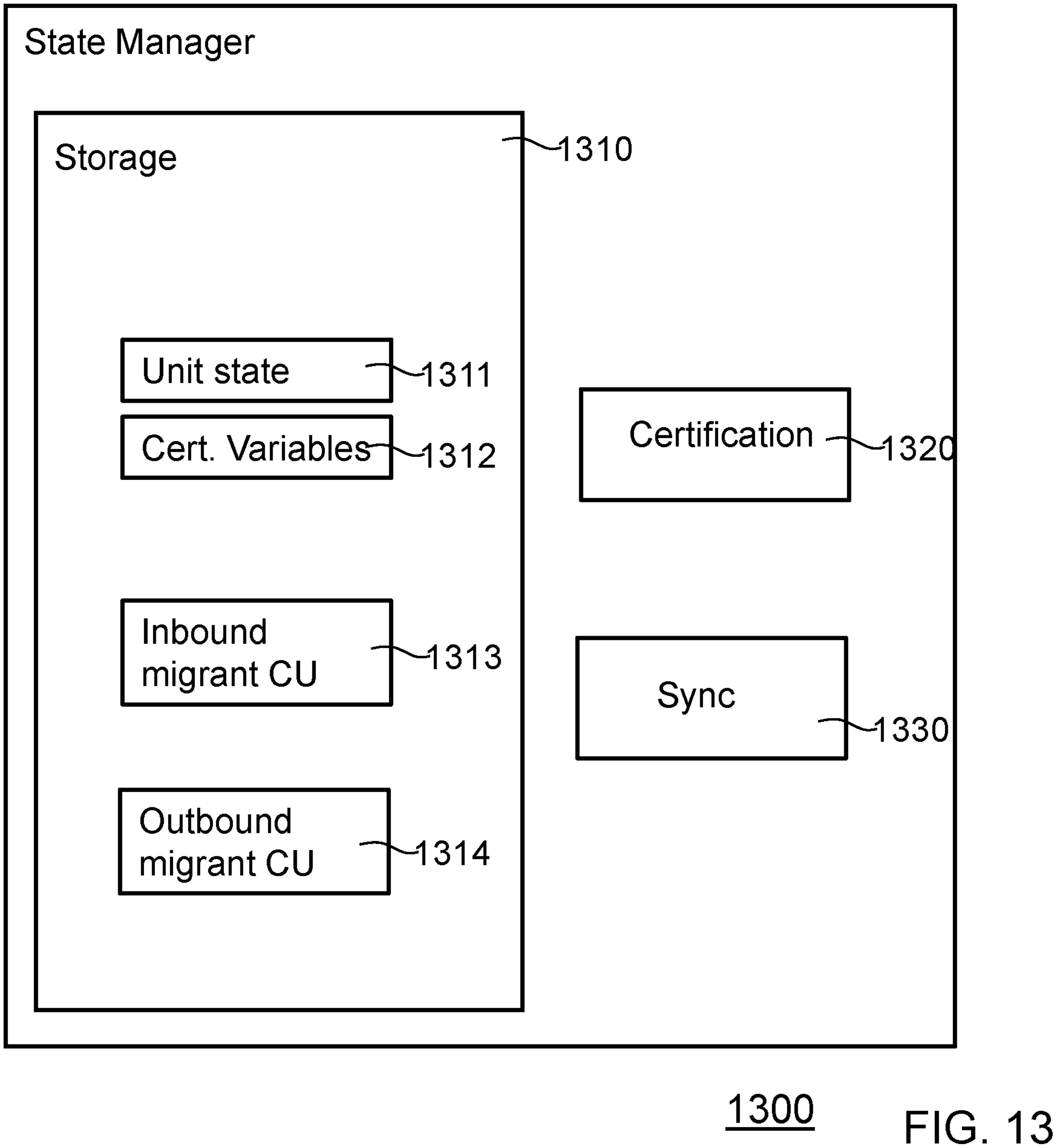
FIG. 13 shows a more detailed embodiment of a state manager component.

FIG. 13 shows a more detailed embodiment of a state manager component 1300, e.g. of the state manager component 65 of FIG. 6.

The state manager component 1300 comprises a storage component 1310, a certification component 1320 and a synchronization component 1330. The storage component 1310 comprises directories 1311, 1312, 1313 and 1314 for storing the unit state, certified variables of the unit state, inbound migrant computational units and outbound migrant computational units respectively. The state manager component 1330 may also maintain and certify the output streams.

According to embodiments, the certification component 1320 is configured to run a threshold-signature or multi-signature algorithm to certify the parts of the storage components 1310. In particular, the certification component 1320 may certify migrant computational units that shall be migrated to another subnet and which are placed in the directory 1314 for outbound migrant computational units.

Figure 14:
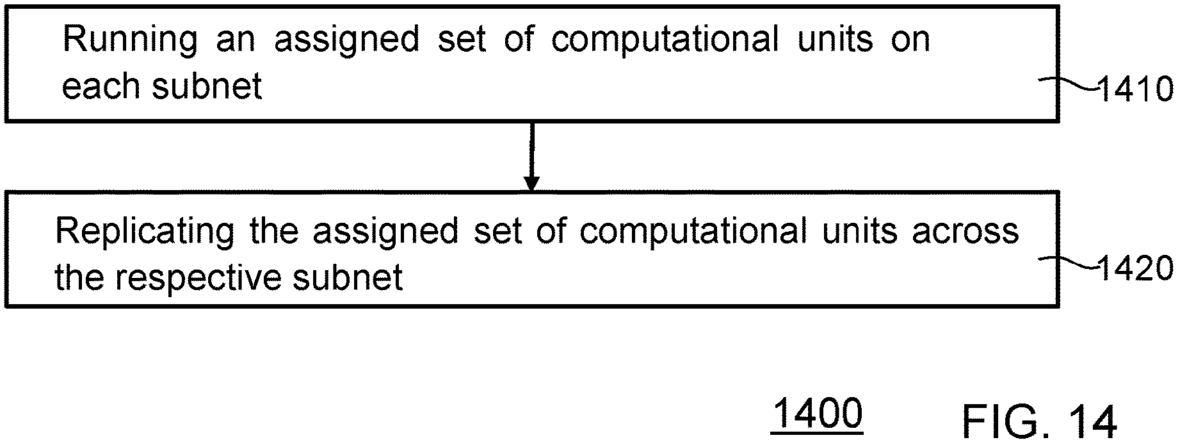
FIG. 14 shows a flow chart comprising method steps of a computer-implemented method for running a distributed network.

FIG. 14 shows a flow chart 1400 comprising method steps of a computer-implemented method for running a distributed network comprising a plurality of subnets according to embodiments of the invention. The distributed network may be e.g. embodied as the network 100 as shown in FIG. 1.

At a step 1410, each subnet of the plurality of subnets runs a set of computational units on its nodes, wherein each of the computational units comprises its own unit state.

At a step 1420, the network replicates the set of computational units across the respective subnet.

Figure 15:
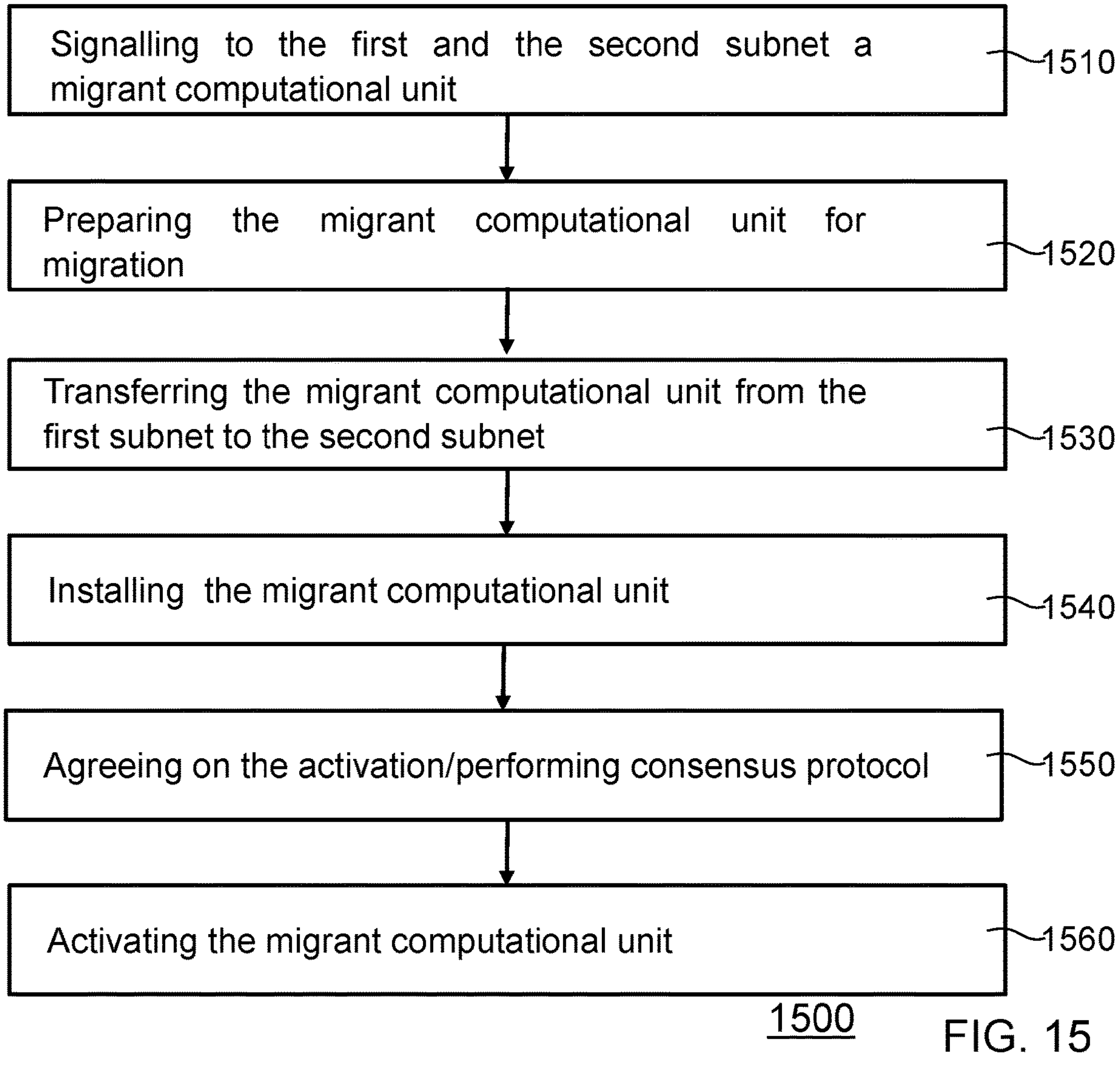
FIG. 15 shows a flow chart comprising method steps of a computer-implemented method for migrating a computational unit from a first subnet to a second subnet.

FIG. 15 shows a flow chart 1500 comprising method steps of a computer-implemented method for migrating a computational unit from a first subnet to a second subnet of a distributed network according to an embodiment of the invention. The distributed network may be e.g. embodied as the network 100 as shown in FIG. 1.

At a step 1510, the central control unit 20 signals to the first and the second subnet SNA, SNB a computational unit of the first subnet as migrant computational unit that shall be migrated.

At a step 1520, the first subnet SNA prepares the migrant computational unit for migration.

This step 1520 may include to schedule a migration time/migration block height, e.g. by a computational unit manager. The step 1520 may further include that the first subnet SNA stops to accept messages for the migrant computational unit after the migration time/migration block height and that the first subnet SNA stops to execute the migrant computational unit and/or to modify the unit state of the migrant computational unit after the migration time/migration block height.

At a step 1530, the migrant computational unit at the migration block height is transferred from the first subnet to the second subnet. This may be performed by various transfer mechanisms as explained e.g. with reference to FIGS. 3*a* to 3*e*.

At a step 1540, the nodes of the second subnet SNB install the migrant computational unit.

At a step 1550, the nodes of the second subnet SNB agree on the activation of the migrant computational unit. This may be performed in particular by performing a consensus protocol.

Finally, at a step 1560, the nodes of the second subnet activate and run the transferred migrant computational unit on the second subnet SNB.

Figure 16:
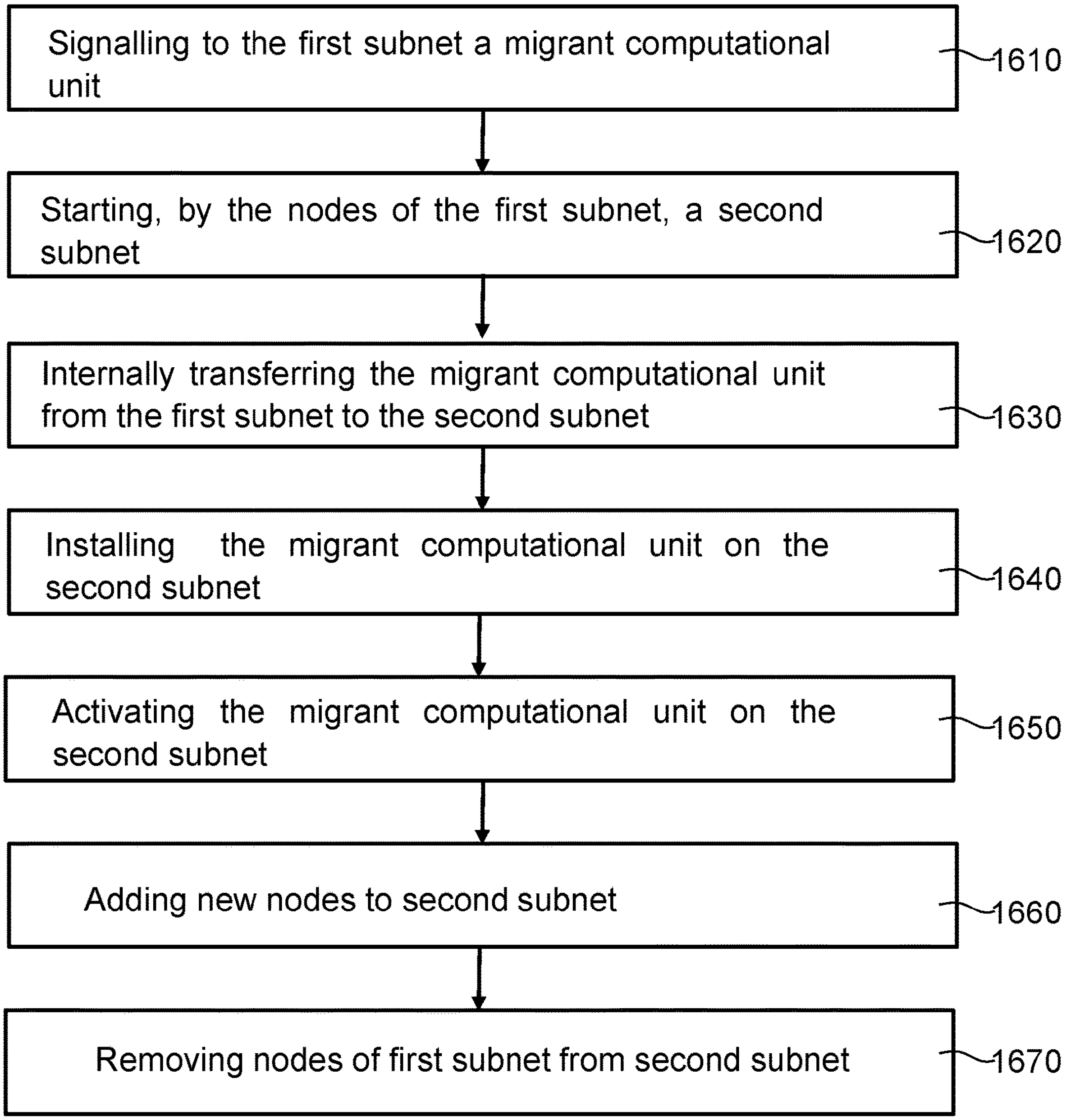
FIG. 16 shows a flow chart comprising method steps of another computer-implemented method for migrating a computational unit from a first subnet to a second subnet.

FIG. 16 shows a flow chart 1600 comprising method steps of a computer-implemented method for migrating a computational unit from a first subnet to a second subnet of a distributed network according to an embodiment of the invention. The distributed network may be e.g. embodied as the network 100 as shown in FIG. 1.

At a step 1610, the central control unit 20 signals to the first subnet SNA a computational unit of the first subnet as migrant computational unit that shall be migrated to a second subnet that is not existent yet and hence has to be newly created.

At a step 1620, the nodes of the first subnet create and start the new second subnet by creating a partition for a new replica on their nodes.

At a step 1630, the migrant computational unit is transferred from the first subnet to the second subnet internally, i.e. within the respective nodes of the first subnet SNA. Before the transfer the migrant computational unit may be brought into a migrating state.

At a step 1640, the nodes of the first subnet which also run the second subnet install the migrant computational unit on the second subnet.

Then the nodes may perform a step of agreeing on the activation.

At a step 1650, the nodes of the first and the second subnet start to activate and run the migrant computational unit on the second subnet.

At a step 1660, additional nodes may be added to the second subnet that are not part of the first subnet.

At a step 1670, the nodes of the first subnet may be removed from the second subnet. Thereby the migration has been finalized.

Figure 17:
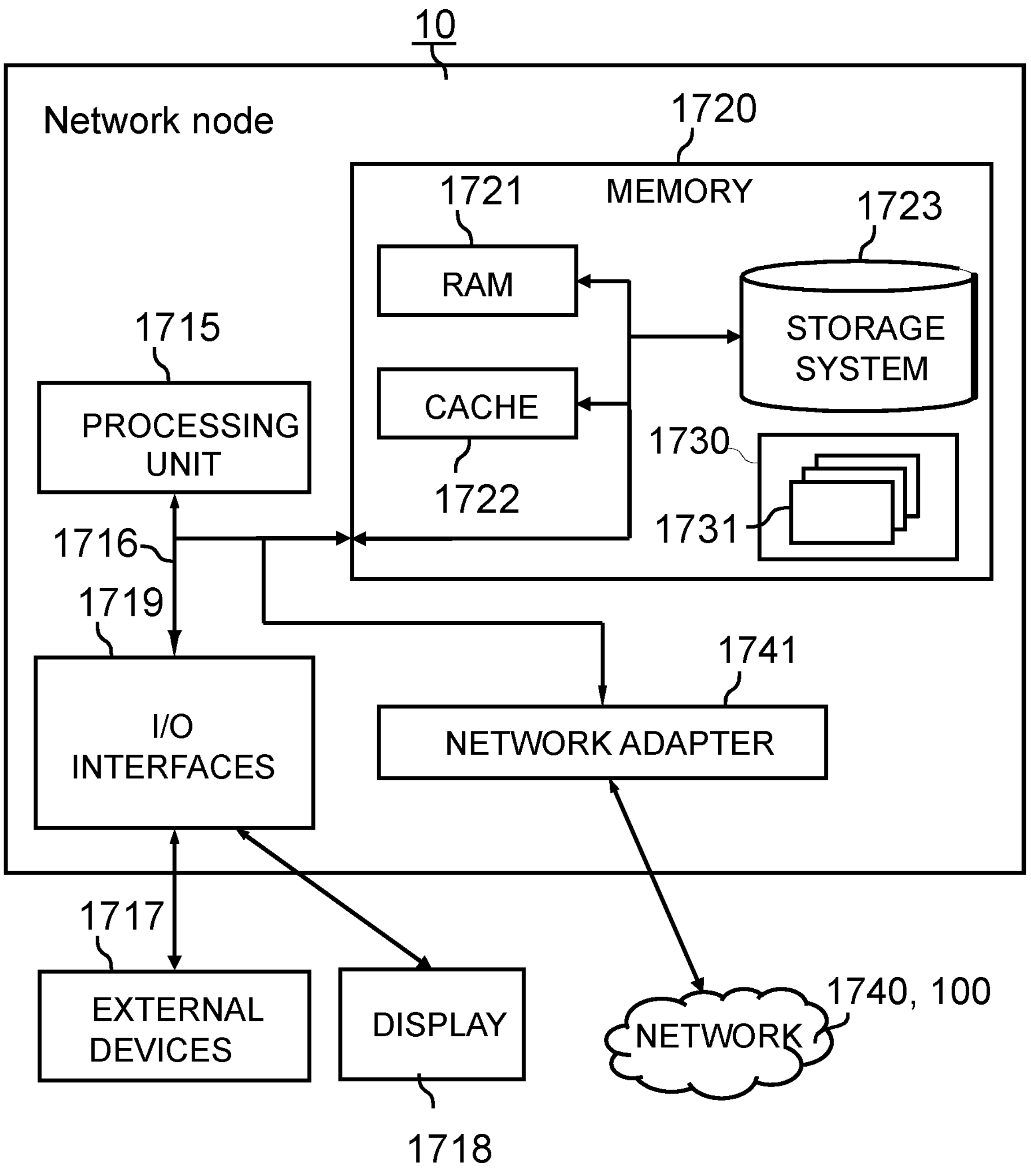
FIG. 17 shows an exemplary embodiment of a node according to an embodiment of the invention.

Referring now to FIG. 17, a more detailed block diagram of a network node 10 according to embodiments of the invention is shown, e.g. of the network 100 of FIG. 1. The network node 10 establishes a computing node that may perform computing functions and may hence be generally embodied as computing system or computer. The network node 10 may be e.g. a server computer. The network node 10 may be operational with numerous other general purpose or special purpose computing system environments or configurations.

The network node 10 may be described in the general context of computer system-executable instructions, such as program modules, being executed by a computer system. Generally, program modules may include routines, programs, objects, components, logic, data structures, and so on that perform particular tasks or implement particular abstract data types. The network node 10 is shown in the form of a general-purpose computing device. The components of network node 10 may include, but are not limited to, one or more processors or processing units 1715, a system memory 1720, and a bus 1716 that couples various system components including system memory 1720 to processor 1715.

Bus 1716 represents one or more of any of several types of bus structures.

Network node 10 typically includes a variety of computer system readable media.

System memory 1720 can include computer system readable media in the form of volatile memory, such as random access memory (RAM) 1721 and/or cache memory 1722. Network node 1710 may further include other removable/non-removable, volatile/non-volatile computer system storage media. By way of example only, storage system 1723 can be provided for reading from and writing to a non-removable, non-volatile magnetic media (not shown and typically called a "hard drive"). As will be further depicted and described below, memory 1720 may include at least one computer program product having a set (e.g., at least one) of program modules that are configured to carry out the functions of embodiments of the invention.

Program/utility 1730, having a set (at least one) of program modules 1731, may be stored in memory 1720 by way of example, and not limitation, as well as an operating system, one or more application programs, other program modules, and program data. Each of the operating system, one or more application programs, other program modules, and program data or some combination thereof, may include an implementation of a networking environment. Program modules 1731 generally carry out the functions and/or methodologies of embodiments of the invention as described herein. Program modules 1731 may carry out in particular one or more steps of a computer-implemented method for operating a distributed network, e.g. of one or more steps of the methods as described above.

Network node 10 may also communicate with one or more external devices 1717 such as a keyboard or a pointing device as well as a display 1718. Such communication can occur via Input/Output (I/O) interfaces 1719. Still yet, network node 10 can communicate with one or more networks 1740 such as a local area network (LAN), a general wide area network (WAN), and/or a public network (e.g., the Internet) via network adapter 1741. According to embodiments the network 1740 may be in particular a distributed network comprising a plurality of network nodes 10, e.g. the network 100 as shown in FIG. 1.

Aspects of the present invention may be embodied as a system, in particular a distributed network comprising a plurality of subnets, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

Aspects of the present invention are described herein with reference to flowchart illustrations and/or block diagrams of methods, networks, apparatus (systems), and computer program products according to embodiments of the invention.

Computer readable program instructions according to embodiments of the invention may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of networks, systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

While there are shown and described presently preferred embodiments of the invention, it is to be distinctly understood that the invention is not limited thereto but may be otherwise variously embodied and practiced within the scope of the following claims.

The invention claimed is:

1. A computer-implemented method for operating a distributed network, the distributed network comprising a plurality of replicated computing clusters, wherein each of the plurality of replicated computing clusters comprises a plurality of assigned nodes, the method comprising:

- running a set of computational units, the computational units being stateful computational units embodied as pieces of software which have their own unit state, wherein the unit state encompasses data that the respective computational unit stores in variables and data the respective computational unit gets from remote calls;
- assigning each of the computational units to one of the plurality of replicated computing clusters according to a replicated computing cluster-assignment, thereby creating an assigned subset of the set of computational units for each of the replicated computing clusters;
- running on each node of the plurality of replicated computing clusters the assigned subset of the computational units;
- replicating, by the plurality of replicated computing clusters, the unit state of the computational units of the assigned subsets across the respective replicated computing clusters by performing an active replication in space;
- migrating a computational unit from a first replicated computing cluster of the plurality of replicated computing clusters to a second replicated computing cluster of the plurality of replicated computing clusters, wherein the migrating comprises
  - signalling to the first and the second replicated computing clusters a computational unit of the first replicated computing cluster as a migrant computational unit that shall be migrated;
  - transferring the migrant computational unit from the first replicated computing cluster to the second replicated computing cluster;
  - agreeing, by the plurality of assigned nodes of the second replicated computing cluster, to activate the migrant computational unit on the second replicated computing cluster by performing a consensus protocol;

installing the migrant computational unit on the second replicated computing cluster; and activating and running the migrant computational unit on the second replicated computing cluster.

2. The computer-implemented method according to claim 1, further comprising:

preparing, by the first replicated computing cluster, the migrant computational unit for migration.

3. The computer-implemented method according to claim 1, the method further comprising:

scheduling a migration time;

stopping to accept messages for the migrant computational unit after the migration time; and stopping to execute the migrant computational unit and/or to modify the unit state of the migrant computational unit after the migration time.

4. The computer-implemented method according to claim 3, wherein the plurality of replicated computing clusters are configured to execute blocks in a consecutive manner; and the migration time is a block height defining the last block that is to be processed by the first replicated computing cluster.

5. The computer-implemented method according to claim 1, wherein the step of obtaining the migrant computational unit comprises:

joining, by the nodes of the second replicated computing cluster, the first replicated computing cluster.

6. The computer-implemented method according to claim 5, wherein the nodes of the second replicated computing cluster join the first replicated computing cluster passively in a listening mode, the listening mode in particular comprising:

verifying all artefacts of the first replicated computing cluster, but not producing any artefacts itself.

7. The computer-implemented method according to claim 5, wherein the joining is performed before the migration time.

8. The computer-implemented method according to claim 5, wherein the step of transferring the migrant computational unit from the first replicated computing cluster to the second replicated computing cluster comprises performing a node internal transfer of the migrant computational unit between a replica of the first replicated computing cluster and a replica of the second replicated computing cluster, wherein the replica of the first replicated computing cluster and the replica of the second replicated computing cluster run on the same node.

9. The computer-implemented method according to claim 1, wherein the step of transferring the migrant computational unit comprises:

obtaining, by each node of the second replicated computing cluster, the migrant computational unit from a node of the first replicated computing cluster via a messaging protocol.

10. The computer-implemented method according to claim 9, wherein the step of transferring the computational unit comprises:

splitting, by the nodes of the first replicated computing cluster, the migrant computational unit into one or more chunks; and transferring the one or more chunks of the migrant computational unit via the messaging protocol from the first replicated computing cluster to the second replicated computing cluster.

11. The computer-implemented method according to claim 1, further comprising:

rejecting, by the first replicated computing cluster, after the migration time, messages for the migrant computational unit, thereby facilitating a re-routing of the respective messages.

12. The computer-implemented method according to claim 1, wherein the distributed network comprises a central control unit, the control unit being configured to perform the step of triggering the migration of the migrant computational unit.

13. The computer-implemented method according to claim 1, wherein the plurality of nodes each comprises a node manager, wherein the node manager is configured to perform the steps of:

monitoring a registry of the control unit;

instructing the nodes to participate in a replicated computing cluster;

moving the computational unit to a partition of the node which participates in the second replicated computing cluster; and/or instructing nodes to stop participation in a replicated computing cluster.

14. A computer-implemented method for operating a distributed network, the distributed network comprising a plurality of replicated computing clusters, wherein each of the plurality of replicated computing clusters comprises a plurality of assigned nodes, the method comprising:

running a set of computational units, the computational units being stateful computational units embodied as pieces of software which have their own unit state, wherein the unit state encompasses data that the respective computational unit stores in variables and data the respective computational unit gets from remote calls;

assigning each of the computational units to one of the plurality of replicated computing clusters according to a replicated computing cluster-assignment, thereby creating an assigned subset of the set of computational units for each of the replicated computing clusters;

running on each node of the plurality of replicated computing clusters the assigned subset of the computational units;

executing, by the nodes of the plurality of replicated computing clusters, computations in a deterministic and replicated manner across the replicated computing clusters;

migrating a computational unit from a first replicated computing cluster of the plurality of replicated computing clusters to a second replicated computing cluster of the plurality of replicated computing clusters, wherein the second replicated computing cluster is not-pre-existing; wherein the migrating comprises signalling to the first replicated computing cluster a computational unit of the first replicated computing cluster as a migrant computational unit that shall be migrated;

starting, by the nodes of the first replicated computing cluster, the second replicated computing cluster;

internally transferring, by the nodes of the first replicated computing cluster and the second replicated computing cluster, the migrant computational unit from the first replicated computing cluster to the second replicated computing cluster;

installing, by the nodes of the first replicated computing cluster and the second replicated computing cluster, the migrant computational unit on the second replicated computing cluster;

agreeing, by the plurality of assigned nodes of the second replicated computing cluster, to activate the migrant computational unit on the second replicated computing cluster by performing a consensus protocol; and activating and running, by the nodes of the first replicated computing cluster and the second replicated computing cluster, the migrant computational unit on the second replicated computing cluster.

15. The computer-implemented method according to claim 14, further comprising:

adding additional nodes to the second replicated computing cluster that are not part of the first replicated computing cluster.

16. The computer-implemented method according to claim 14, further comprising:

removing the nodes of the first replicated computing cluster from the second replicated computing cluster.

17. A distributed network, the distributed network comprising a plurality of replicated computing clusters, wherein each of the plurality of replicated computing clusters comprises a plurality of assigned nodes, wherein the distributed network is configured to perform the steps of a computer-implemented method according to claim 1.

18. A node for a distributed network according to claim 17, the node comprising a hardware processor and memory, wherein the node is configured to participate in a computer-implemented method according to claim 1.

19. A computer program product for operating a distributed network, the distributed network comprising a plurality of replicated computing clusters, the computer program product comprising a non-transitory computer readable storage medium having program instructions embodied therewith, the program instructions executable by one or more of the plurality of nodes to cause the one or more of the plurality of nodes to perform a computer-implemented method according to claim 1.

* * * * *